July 23, 1940.   C. E. SMITH   2,208,806
TYPEWRITING AND LIKE MACHINE
Filed Aug. 21, 1936   9 Sheets-Sheet 1
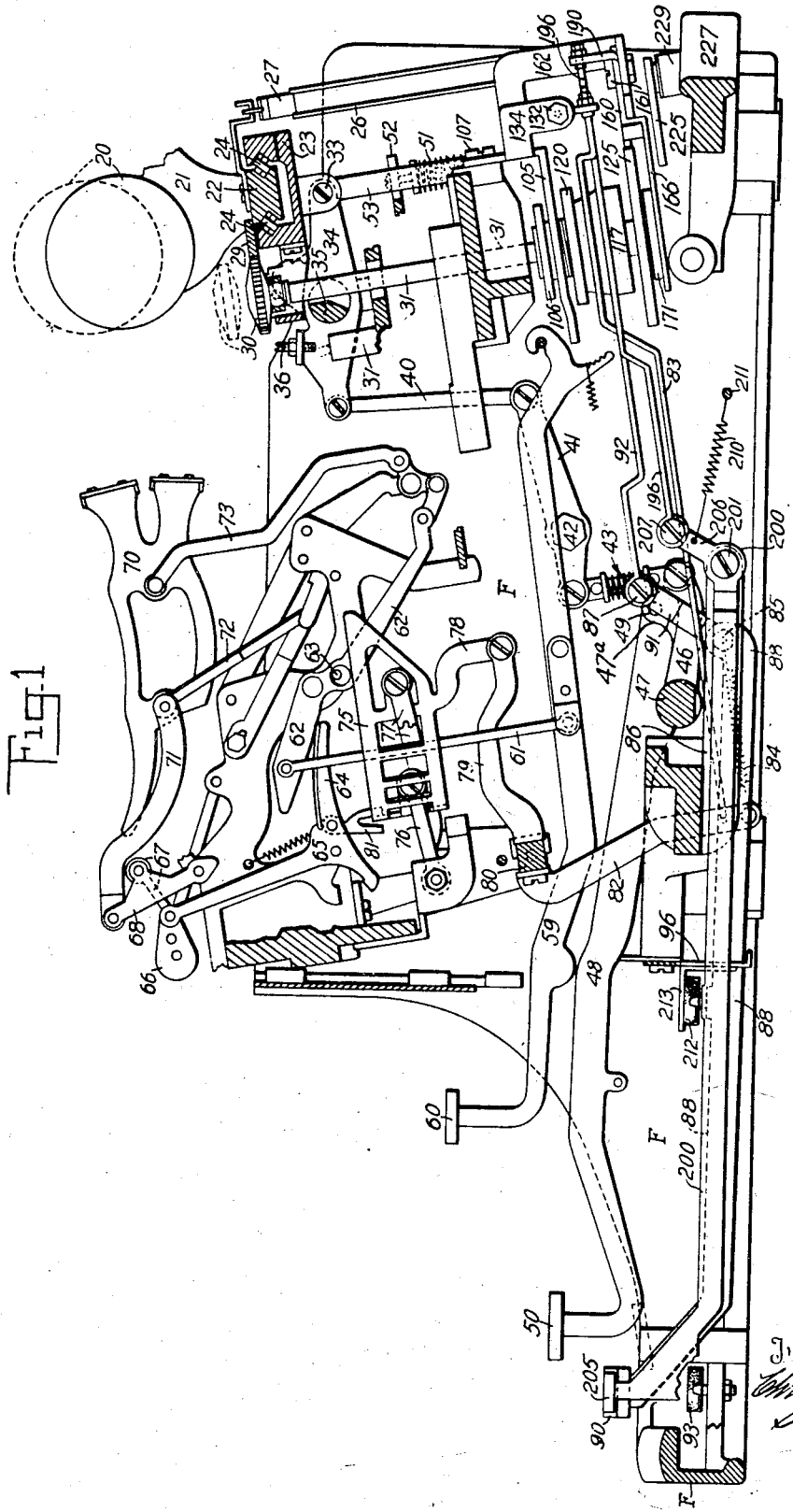

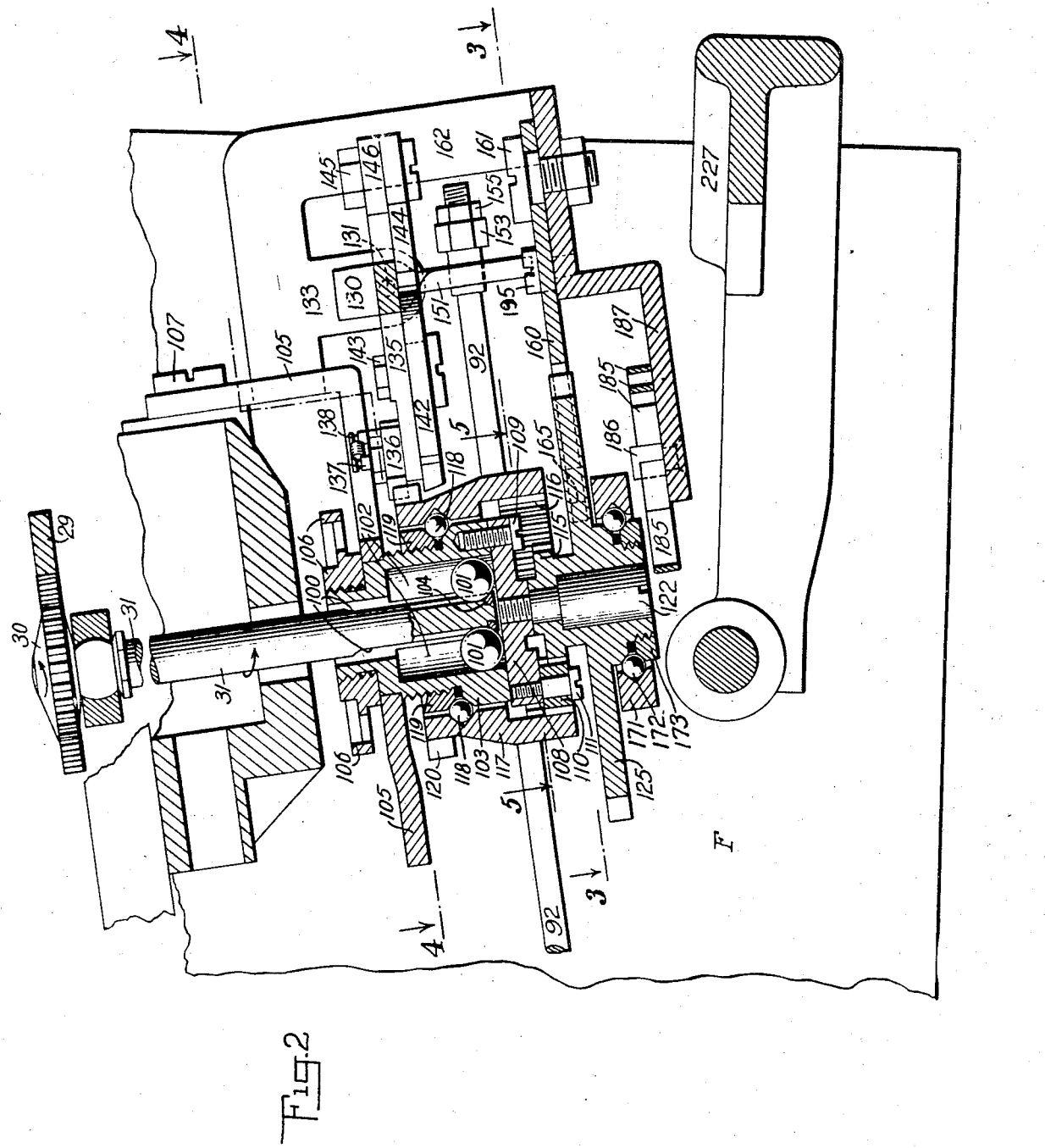

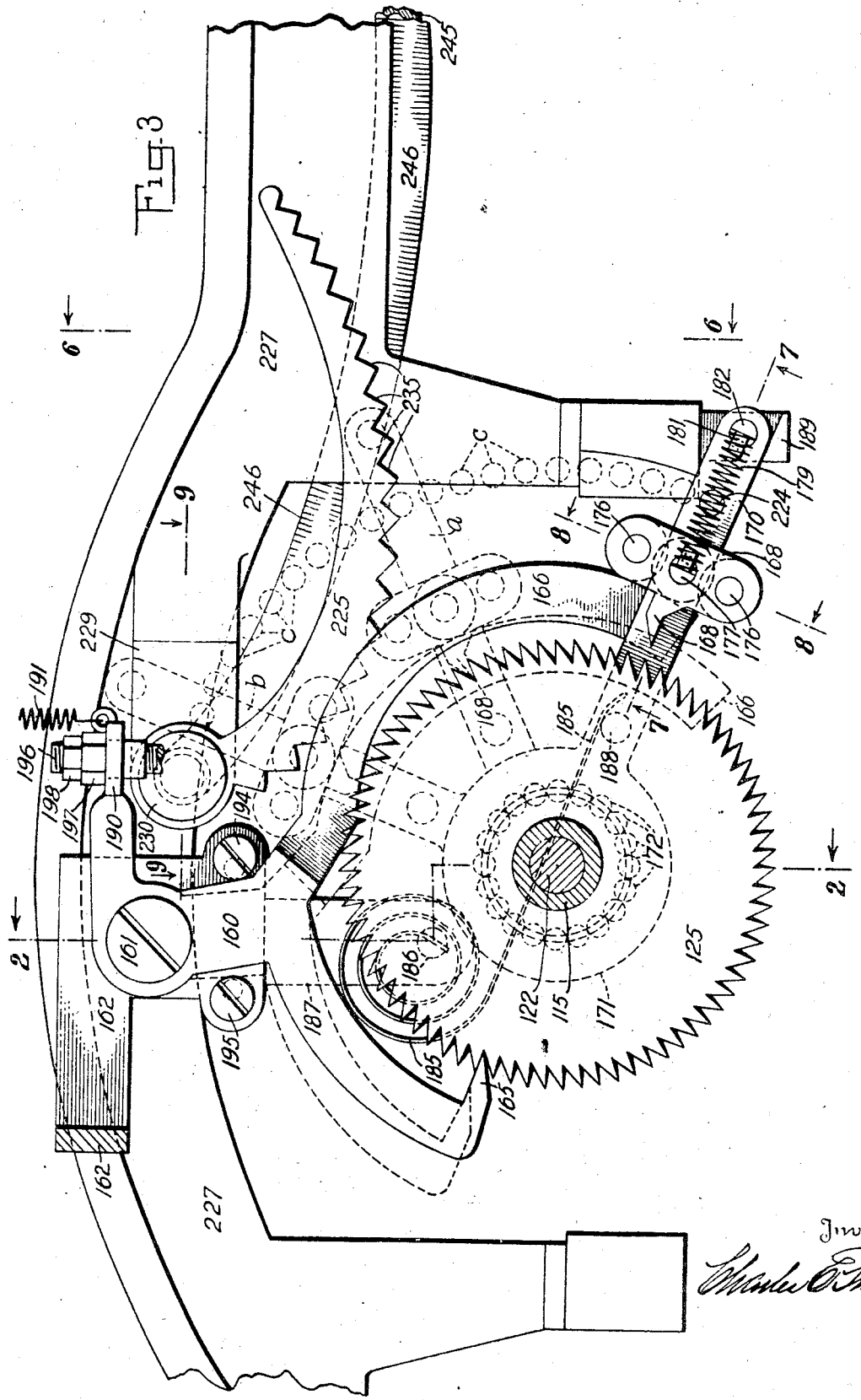

July 23, 1940.  C. E. SMITH  2,208,806
TYPEWRITING AND LIKE MACHINE
Filed Aug. 21, 1936  9 Sheets-Sheet 4
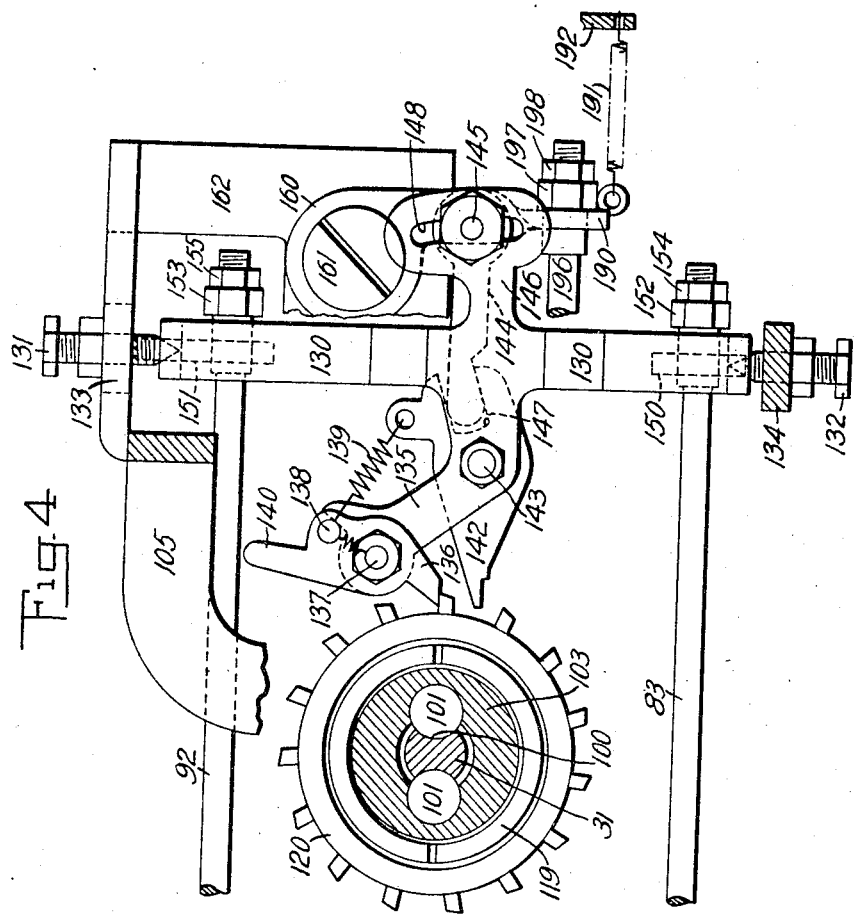
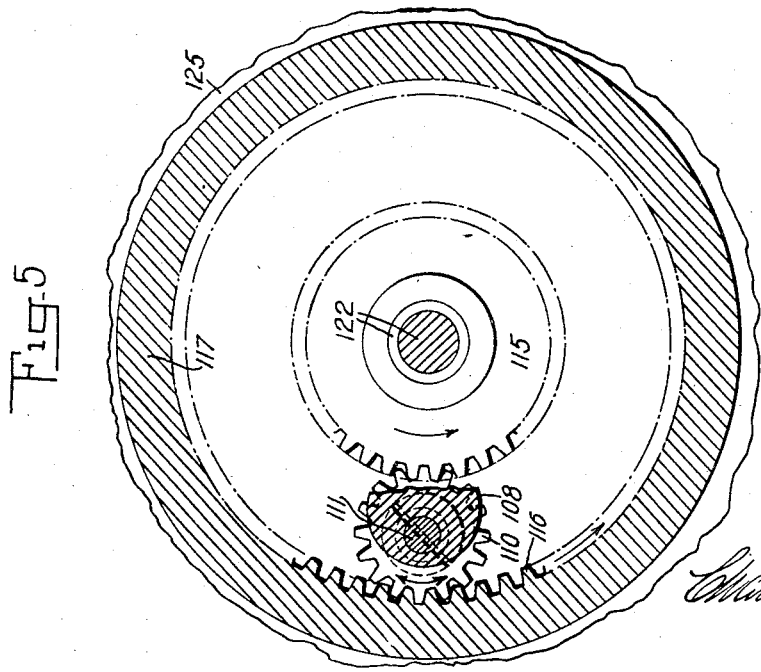
Inventor
Charles E. Smith

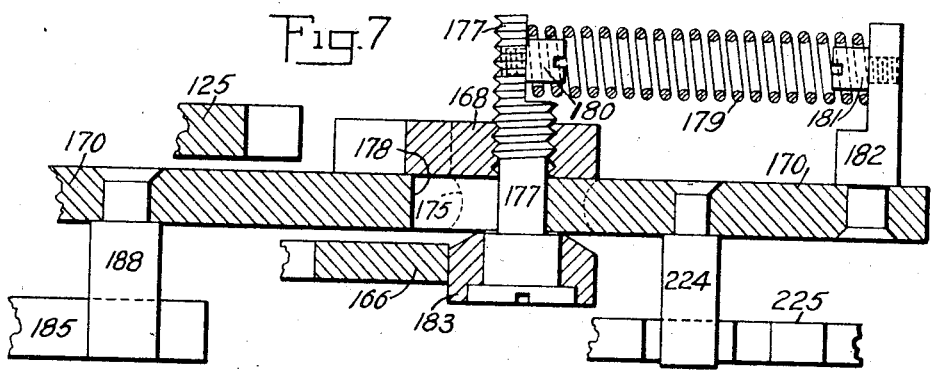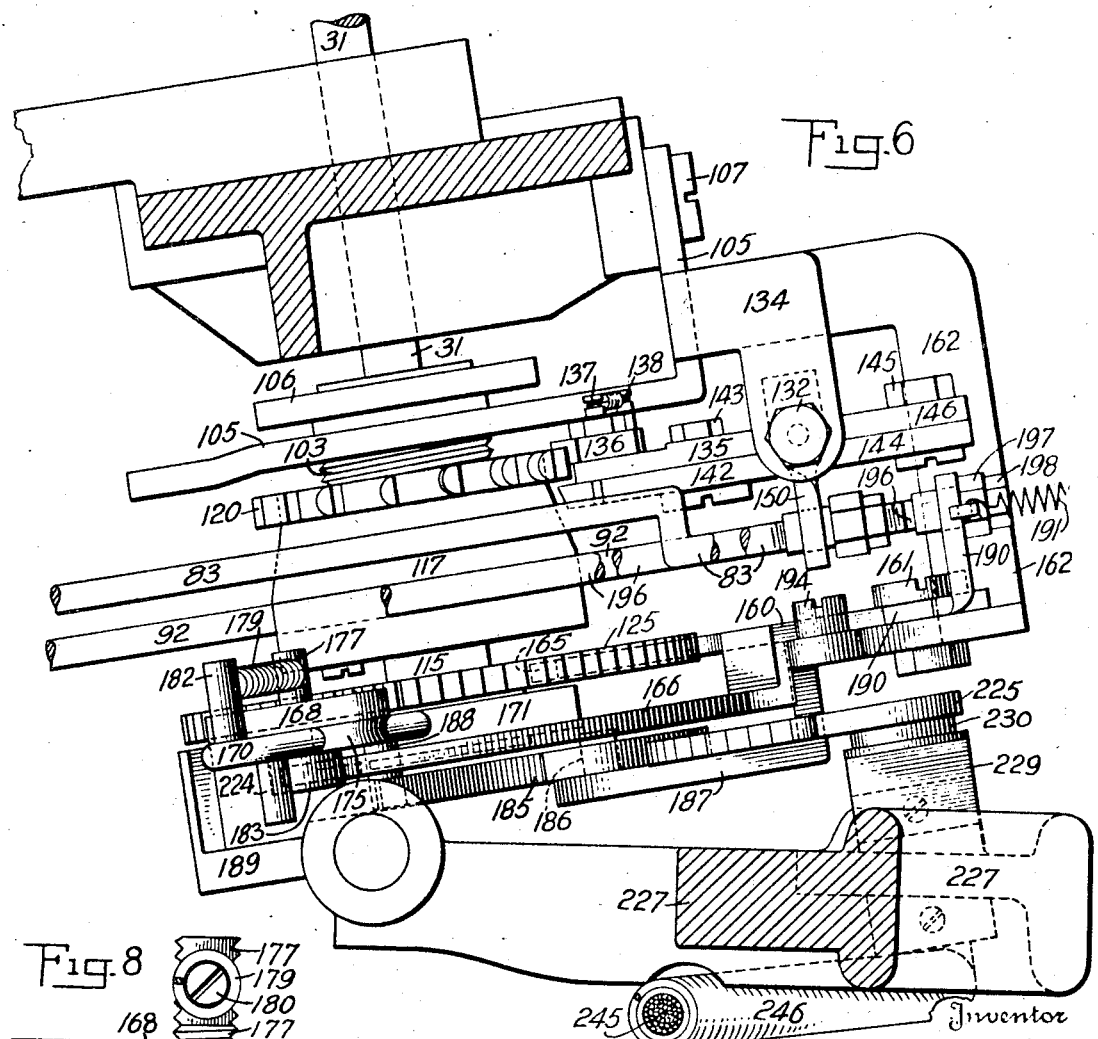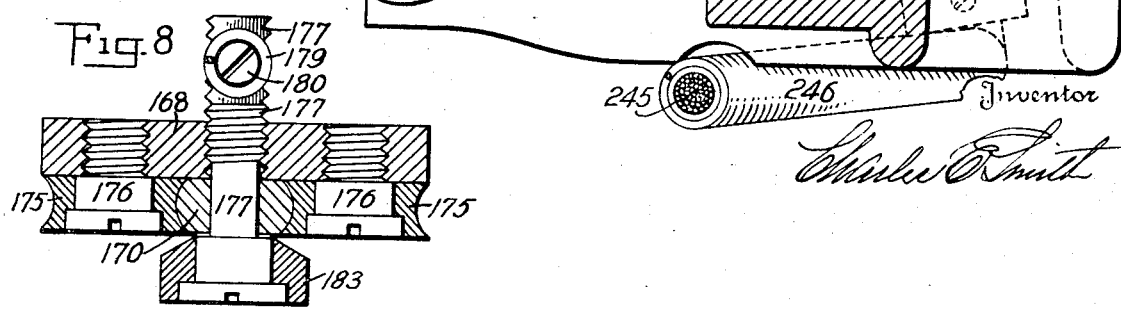

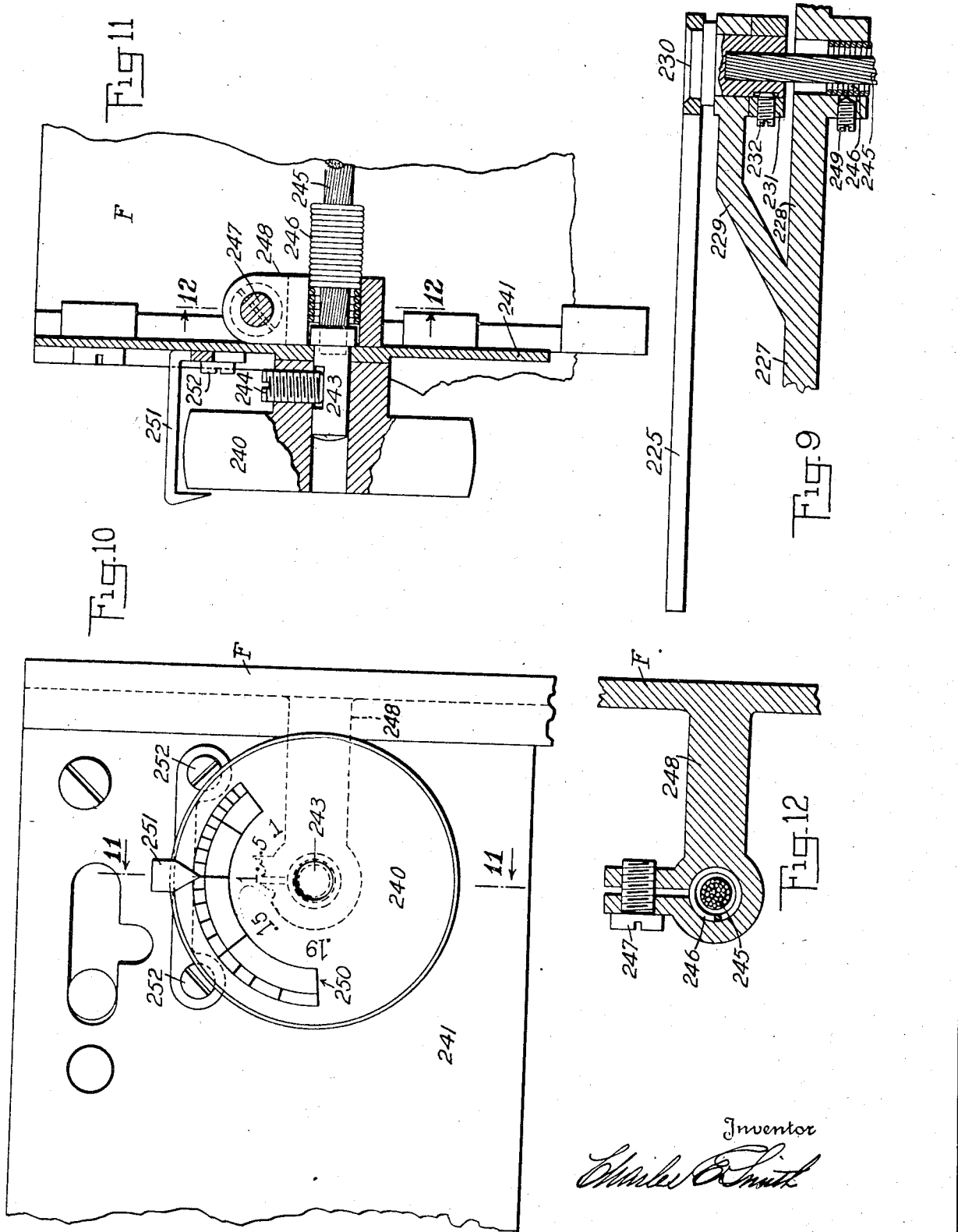

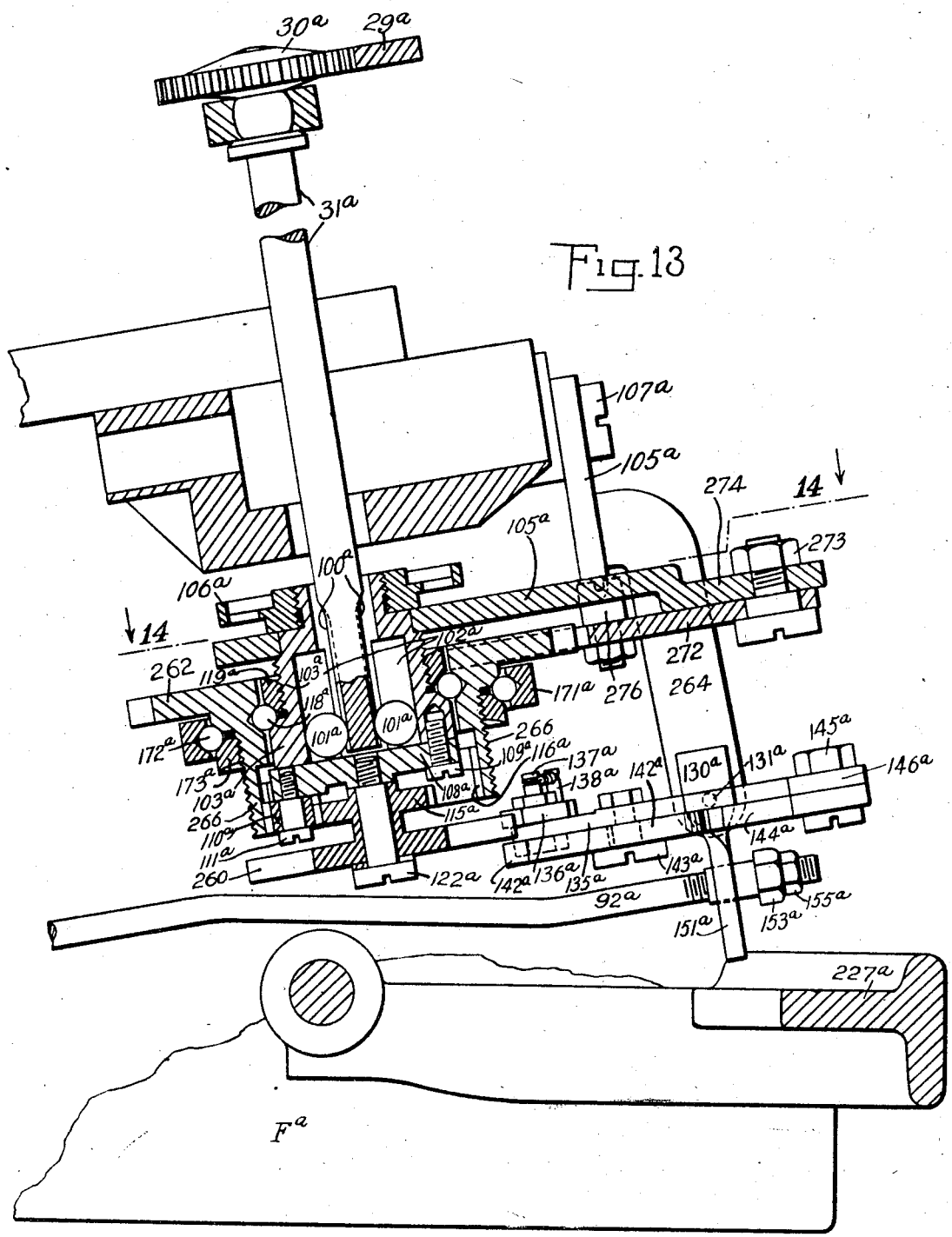

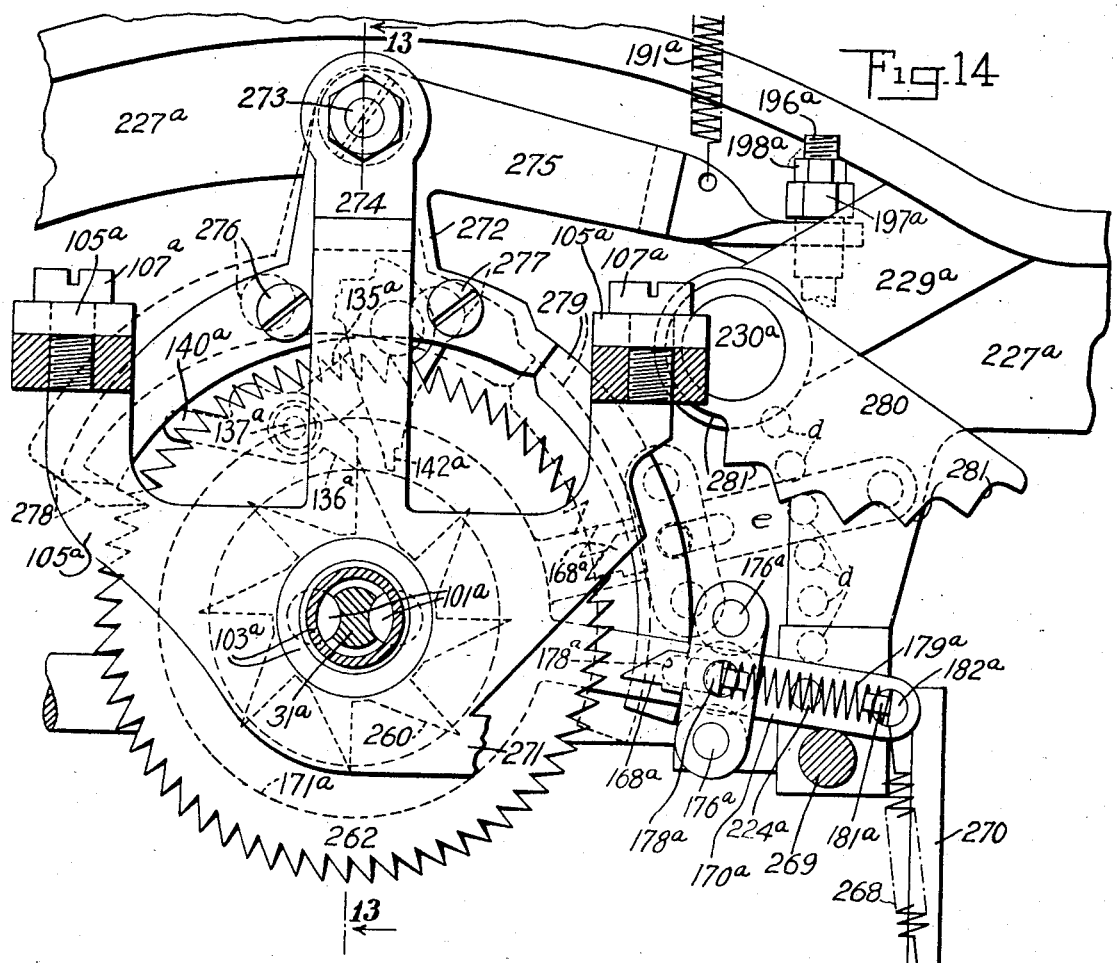
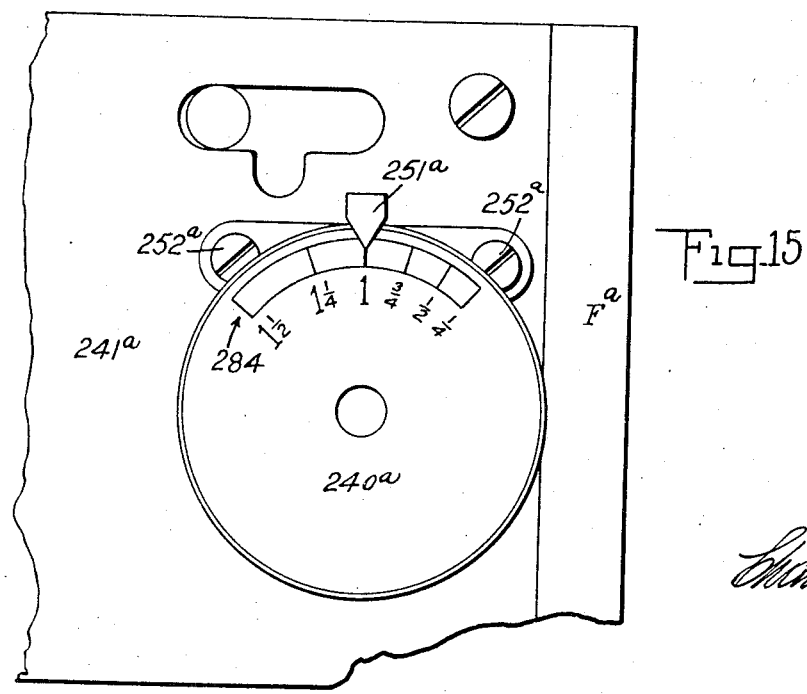

July 23, 1940. C. E. SMITH 2,208,806
TYPEWRITING AND LIKE MACHINE
Filed Aug. 21, 1936 9 Sheets-Sheet 9
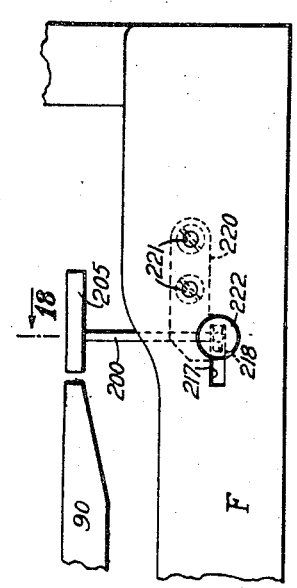
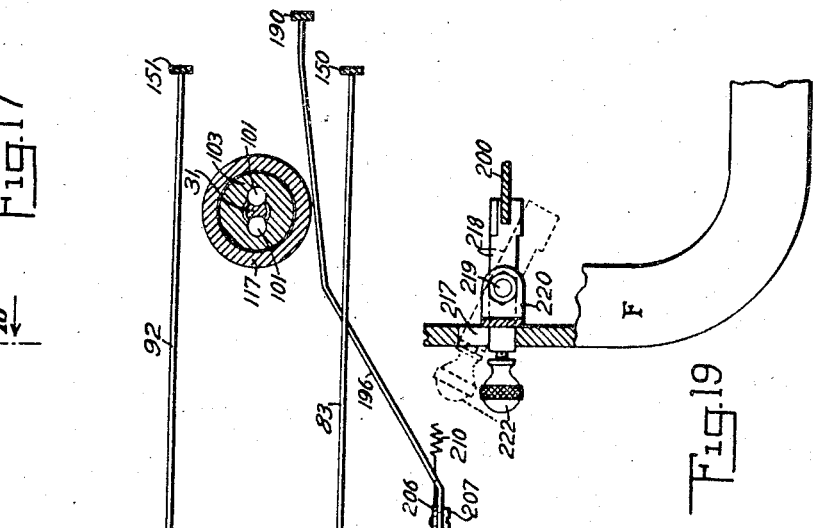
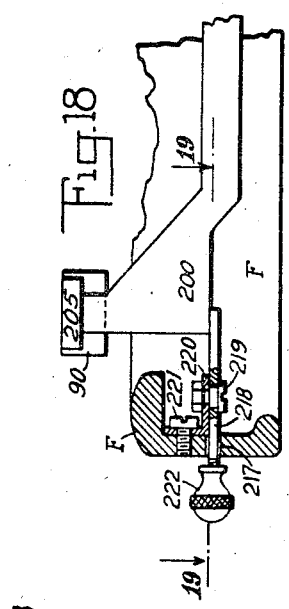
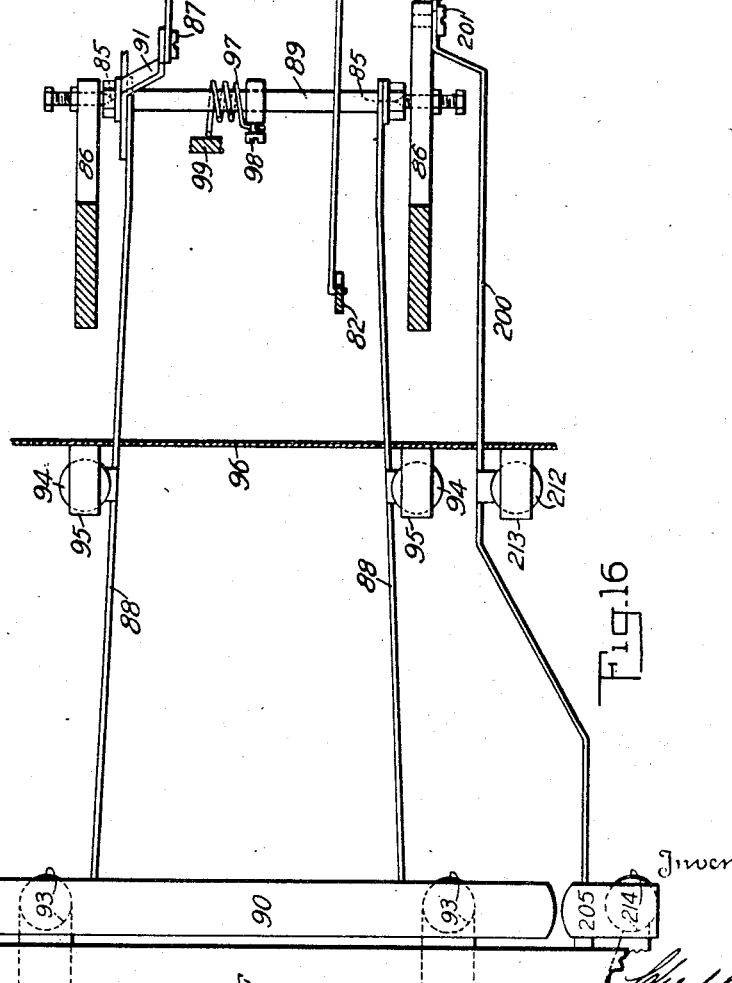
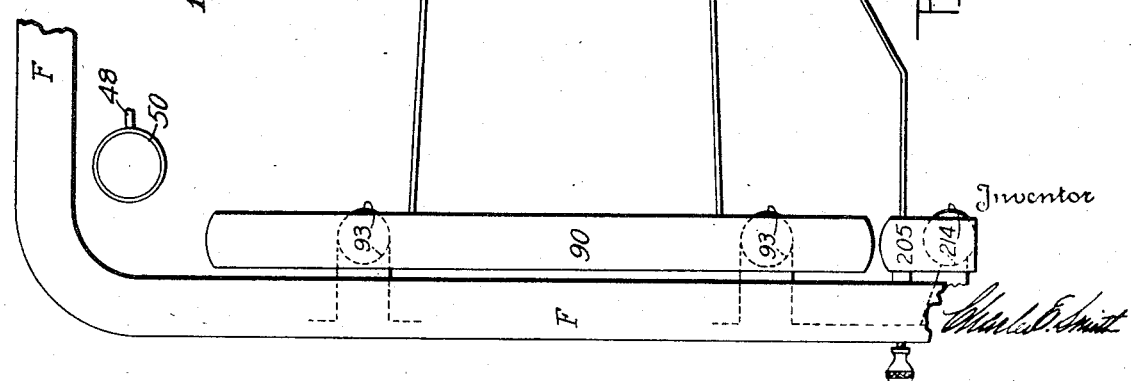

Patented July 23, 1940

2,208,806

UNITED STATES PATENT OFFICE 2,208,806

TYPEWRITING AND LIKE MACHINE

Charles E. Smith, Tonawanda, N. Y., assignor to Remington Rand Inc., New York, N. Y., a corporation of Delaware Application August 21, 1936, Serial No. 97,225

19 Claims. (Cl. 197—84)

My invention relates to typewriting and like machines, and more particularly to improved means for justifying typewritten lines whereby lines of uniform length may be produced to provide typing having uniform right-hand as well as left-hand margins.

One of the main objects of my invention is to provide improved, highly efficient and reliable means with the aid of which typewritten lines of unjustified copy may be rapidly rewritten into lines of uniform length, after a setting of the mechanism has been established.

Another object of my invention is to provide means as specified above which may be readily embodied in a typewriting machine of standard construction without modifying, or materially modifying the existing structure, and which is comparatively simple in construction, reliable and highly efficient in use and which may be manufactured at comparatively small cost.

Another object of my invention is to provide means for justifying typewritten lines in recopying by varying the extent of spacing between words and without modifying the ordinary spacing between the letters of the words.

A further object of my invention is to provide means readily settable to predetermine the extent of spacing which will be provided between all the words of a line when rewritten.

A still further and more specific object of my invention is to provide in a typewriting machine two independently operable escapement means, one escapement means being under the control of certain of the keys to effect a normal letter space advance of the carriage and the other escapement means being under the control of certain other of the keys to effect an advance of the carriage in fractional amounts above or below the distance of said normal letter space, said fractional amounts being predetermined by a manually adjustable means.

To the above and other ends which will hereinafter appear, my invention consists in the features of construction, arrangements of parts and combinations of devices set forth in the following description and particularly pointed out in the appended claims.

In the accompanying drawings, wherein like reference characters designate corresponding parts in the different views:

Fig. 1 is a side elevational view of a No. 10 Remington Noiseless typewriting machine equipped with the devices of my invention, the view showing certain parts in section and other parts omitted.

Fig. 2 is an enlarged sectional view showing one form of a carriage escapement mechanism arranged in accordance with my invention, and as embodied in the machine shown in Fig. 1, this view being taken substantially on line 2—2 in Fig. 3 and viewed in the direction indicated by the arrows at said line.

Fig. 3 is a sectional view of a portion of the escapement mechanism taken substantially on line 3—3 of Fig. 2 and viewed in the direction indicated by the arrows at said line.

Fig. 4 is a sectional view of another portion of the escapement mechanism taken substantially on line 4—4 of Fig. 2 and viewed in the direction indicated by the arrows at said line.

Fig. 5 is a sectional view of still another portion of the escapement mechanism taken substantially on line 5—5 of Fig. 2 and viewed in the direction indicated by the arrows at said line.

Fig. 6 is a sectional view of the escapement mechanism as taken substantially on line 6—6 of Fig. 3 and viewed in the direction indicated by the arrows at said line.

Fig. 7 is a sectional view of a detail of the escapement mechanism taken substantially on line 7—7 of Fig. 3 and viewed in the direction indicated by the arrows at said line.

Fig. 8 is a sectional view of another detail of the escapement mechanism taken substantially on line 8—8 of Fig. 3 and viewed in the direction indicated by the arrows at said line.

Fig. 9 is a sectional view of still another detail of the escapement mechanism showing the control member therefor as taken substantially on line 9—9 of Fig. 3 and viewed in the direction indicated by the arrows at said line.

Fig. 10 is an enlarged front elevational view of a hand-settable wheel for the control member in the form of escapement mechanism shown in Fig. 2.

Fig. 11 is a sectional view of the same as taken substantially on the line 11—11 of Fig. 10 and viewed in the direction indicated by the arrows at said line.

Fig. 12 is a sectional view of a detail of the same taken substantially on line 12—12 of Fig. 11 and viewed in the direction indicated by the arrows at said line.

Fig. 13 is an enlarged sectional view showing a modified form of a carriage escapement mechanism also constructed in accordance with my invention and which may likewise be embodied in the machine shown in Fig. 1, this view being taken substantially on line 13—13 of Fig. 14 and viewed in the direction indicated by the arrows at said line.

Fig. 14 is a sectional view of the modified form of escapement mechanism taken substantially on line 14—14 of Fig. 13 and viewed in the direction indicated by the arrows at said line.

Fig. 15 is an enlarged front elevational view of a hand-settable wheel for the control member in the modified form of escapement mechanism shown in Fig. 13.

Fig. 16 is a sectional view of a portion of the machine shown in Fig. 1, this view showing certain parts in section and various other parts omitted in order to more clearly show the actuating means for either form of escapement mechanisms of my invention.

Fig. 17 is a front elevational view of a detail of the actuating means shown in Fig. 16.

Fig. 18 is a sectional view taken substantially on the line 18—18 of Fig. 17 and viewed in the direction indicated by the arrows at said line.

Fig. 19 is a sectional view taken substantially on line 19—19 of Fig. 18 and viewed in the direction indicated by the arrows at said line.

I have shown my invention embodied, in the present instance, in a No. 10 Remington Noiseless machine in which the invention may readily be embodied with but few changes in the existing structural features. However, it is desired to be understood that my invention is not restricted to embodiment in such machine but may be employed in various other types of typewriting machines as well, wherever found available.

I have shown in the accompanying drawings only so much of the usual structure of the No. 10 Remington Noiseless machine as is necessary to arrive at a complete understanding of my present invention in its embodiment therein.

The portion of this machine illustrated in Fig. 1 comprises a platen 20 carried in the usual manner by a carriage including end plates 21 and a cross bar 22 mounted for longitudinal movement on a case shifting cross bar 23 by crossed antifriction rollers 24. The carriage thus mounted is biased to travel transversely of the machine toward a left or in a letter-space direction by a spring drum 26 connected to the carriage by a pull band 27. This movement of the carriage in letter-space direction is controllable by escapement mechanism as will hereinafter appear. The usual releasable feed rack 29 is shown carried by the carriage, which rack 29 normally engages a feed pinion 30 carried by an escapement wheel shaft 31. An escapement mechanism constructed in accordance with the present invention coacts with the lower end of the shaft 31, which mechanism will be later described in detail.

The shaft 31 is mounted at its upper end in a bearing carried by the case shift cross bar 23, mounted to move substantially vertically for case shifting the platen 20 in the usual manner from the full line to dotted line position shown in Fig. 1. Various parts of the complete case shifting mechanism have been omitted but it may be generally described that the case shift cross bar 23 is pivotally attached at 33 to the rear ends of parallel arms 34 carried by a rock shaft 35 pivotally supported at its ends by the frame F of the machine. The forward end of one of the arms 34 carries an adjustable stop screw 36 engageable with a fixed member 37 for adjustably limiting the upward case shift movement of the carriage, the lower case position of the carriage being limited by the usual stop mechanism which has not been shown.

The actuating connections for the rock shaft 35 have been illustrated in a rather simplified or conventional manner in the present instance as comprising a downwardly extending link 40 connecting the forward end of one of the arms 34 with the rear end of a sub-lever 41 which is fulcrumed at 42 to the frame F of the machine. The forward end of the lever 41 is connected by the usual yielding link designated as a whole by the reference character 43, to a crank arm 46 fixed to a rock shaft 47 pivotally carried by the frame F of the machine. The rock shaft 47 is connected with and operated by either of the two usual case shift key levers located at opposite sides of the keyboard. One of these case shift key levers is shown at 48 and extends over and bears on the rock shaft 47 and is operatively connected at 49 to a crank arm 47ª on said shaft 47. The front end of each of the shift key levers is, of course, provided with the usual shift key 50, and each of said levers will also carry the usual shift lock key mechanism which has been omitted from the present drawings.

It may be seen from the above general description of the case shifting mechanism that the platen 20 may be raised from its normal lower case position as illustrated in full lines to its upper case or dotted line position by a depression of one of the shift keys 50. The usual counter-balancing springs 51 are attached at their upper ends to a portion 52 carried by the frame F of the machine while their lower ends exert an upward force on arms 53 extending downwardly from the case shift cross bar 23, which force counter-balances a portion of the weight of the various parts which are operated upwardly for case shifting movement.

During a case shifting of the parts as indicated above, the escapement shaft 31 receives a longitudinal shift with the carriage in the usual manner, the connection between said shaft and the escapement mechanism which controls it affording such movement of the shaft as will hereinafter more clearly appear.

The printing instrumentalities or type actions may be of the usual construction employed in the No. 10 Remington Noiseless machine and accordingly will be described only in a very general manner. In this type action, two keys are employed to selectively actuate each type bar in a manner to print from one or another type carried thereby according to the key operated, but for the purpose of the present invention, it is merely necessary to consider the actuation of a type bar from a single key, it being understood that the operation is the same, so far as the operation of the devices of the present invention is concerned, for all printing keys.

The illustrated key lever 59 carries a printing key 60 at its forward end and is connected by a link 61 to a sub-lever 62, the operating movement of the key lever and sub-lever being limited by a stop 63 before the associated type bar reaches the printing position. The sub-lever 62 coacts with an arm 64 of an angular driving lever 65 pivotally connected at its upper end to a momentum accumulator 66, the momentum accumulator having a rearwardly extending arm 67 pivotally connected to one toggle member 68 which is in turn connected to a type bar 70 by another toggle member 71. The type bar 70 is mounted on supporting links 72 and 73 for movement to the printing position.

The usual means for actuating a carriage escapement mechanism by the operation of the printing instrumentalities or type bars has been shown as comprising a segmental universal bar 75 pivotally supported by a central link 76 and two end links 77. The universal bar 75 is provided with lateral depending arms 78 pivotally connected to rearwardly extending crank arms 79 on a rock shaft 80, the rock shaft being pivotally mounted in the frame F of the machine. The universal bar 75 is actuated by the type bar mechanism through an actuating member 81 pivotally connected to depend from the sub-lever arm 64 of each type action and having a bifurcated lower end straddling the universal bar. The bifurcation in the member 81 provides considerable lost motion whereby the universal bar is not actuated until the type bar has completed a predetermined extent of its travel toward the printing position.

In this manner, the universal bar 75 is operated downwardly in the same manner by the actuation of any one of the various printing keys, such as 60, to rock the shaft 80 in a clockwise direction as viewed in Fig. 1. It will be understood of course, that the type bar mechanisms are all arranged in a segmental manner about the printing point so that all members 81 coact with the segmental universal bar in the same manner. A central depending crank arm 82 is carried by the rock shaft 80 and is connected at its lower end to a rearwardly extending pull rod or link 83. This rock shaft assembly including the universal bar is biased to its normal position by a spring 84 extending from the lower end of the crank arm 82 to a fixed member of the machine.

From a consideration of Fig. 16 it will be seen that the space bar levers 88 are carried by a rock shaft 89 pivotally mounted in the usual manner at 85 on depending arms 86 of a cross member carried by the frame F of the machine, and a space bar 90 is jointly carried at the front ends of these levers 88. An arm 91 extends upwardly and rearwardly from the space bar rock shaft 89 and is connected at 87 to a rearwardly extending pull rod 92 which is operatively connected to actuate a dog rocker in the usual manner as will hereinafter appear. The space bar 90 is biased to its normal upper position by the usual coil spring 97 surrounding and attached at 98 to the rock shaft 89, the other end engaging a fixed member 99 of the machine. The operated or depressed position of the space bar 90 is limited by the usual adjustable stop buttons 93, the normal position being limited by similar adjustable stop buttons 94 carried by the levers 88 to normally engage brackets 95 carried in the usual manner by a guide comb 96 of the machine.

It should be understood that the portion of the machine thus far described may be the same as the construction employed in the No. 10 Remington Noiseless machine, and it is intended that the accompanying drawings be interpreted as a complete disclosure of such portion of the machine although various parts and certain refinements therein have been omitted in order to simplify the disclosure of my invention. The portion of this complete machine which is chiefly affected by the incorporation of my invention therein is the carriage feed or escapement mechanism, or the means by which the carriage is controlled in its movement under the power of the spring drum 26 for letter space movements and for spacing between words.

In the embodiment of my invention in the No. 10 Remington Noiseless machine, the devices thereof coact chiefly with the lower end of the escapement shaft 31. Before describing such devices in detail, it may be stated very generally that the step-by-step advance of the carriage or the rotation of shaft 31 is controlled by two independently operable escapement racks or escapement wheels, one escapement wheel being controlled by the actuation of the printing keys and the usual space bar to afford a normal letter space advance of the carriage while the other escapement wheel is controlled by a special key to afford an advance of the carriage in fractional amounts above or below the normal letter space distance, which fractional amounts are predetermined by a manually settable means.

In order to allow the two escapement wheels to coact with the shaft 31 independently of each other, these wheels are connected thereto through an epicyclic or planetary gearing means. This arrangement may be specifically described by referring particularly to Fig. 2 which is an enlarged view of one form of my escapement mechanism. The shaft 31, which was previously described as driven by the carriage through the rack 29 and the pinion 30, is provided with longitudinal grooves 100 receiving anti-friction bearing balls 101 carried in companion grooves 102 in a hub member 103 concentric with the shaft 31. The lower end of the shaft 31 may be provided with a ring retaining member 104 received and held in an annular groove therein for retaining the balls 101 in their proper position when the shaft 31 is moved upwardly by a case shift movement of the carriage.

The hub member 103 is rotatably supported by a bracket 105 attached at 107 to a cross member of the frame F of the machine, which bracket 105 may be the same as that ordinarily employed to support the usual escapement wheel. The hub member 103 extends upwardly through a bearing hole in the bracket 105 and is retained by a brake wheel 106 threaded on a reduced diameter upper end thereof. This brake wheel 106 functions in the usual manner and is to be employed in conjunction with a brake shoe which has not been shown but which operates to prevent too rapid carriage speed when released by a depression of the tabulator key. By this construction, the hub member 103 is mounted within the bracket 105 by rotation of the shaft 31 yet permitting the shaft to be moved longitudinally upward relative thereto for case sift movements.

Referring more particularly to Figs. 2 and 5 it will be seen that a disc 108 is attached to the bottom of the hub member 103 by suitable headed screws 109 threaded therein, which disc carries a planet pinion 110 of the previously mentioned planetary gear arrangement. The planet pinion 110 is freely rotatable about a headed pivot screw 111 having a reduced diameter portion threaded into a tapped opening in the disc 108 at a position off-set from the center of the shaft 31. The planet pinion 110 meshes with a sun pinion 115 and with teeth of an internal gear 116 of a cylindrical outer member 117, as may be clearly seen in Fig. 5.

The cylindrical outer member 117 is mounted to rotate concentrically about the hub member 103 by bearing balls 118 interposed therebetween, the balls 118 being received in an internal annular race formed in the outer member 117 and a companion race formed jointly by annular bevels in the top of a shoulder on the hub member 103 and the bottom of a retaining ring 119 threaded on an intermediate diameter portion of the hub member. A toothed rack or escapement wheel 120 is formed integrally with the cylindrical outer member 117, or may be otherwise attached thereto, which escapement wheel 120 coacts with feed dogs carried by a dog rocker, which feed dogs and dog rocker may be of the usual construction employed in the No. 10 Remington Noiseless machine and will be later described in detail. This escapement wheel 120 in this form of my invention is employed to afford a normal letter space advance of the carriage, and accordingly will hereinafter be referred to as the "normal" escapement wheel.

The sun pinion 115 is mounted to rotate concentrically with the shaft 31 upon a pivot pin 122 having a small diameter upper portion threaded into a tapped opening in the disc 108 while an intermediate diameter portion passes through a bearing hole in the pinion 115 with an elongated headed lower end retaining the pinion on the disc for rotative movement relatively thereto. A second toothed rack or escapement wheel 125 is formed integrally with the sun pinion 115, or may be otherwise attached thereto, which escapement wheel 125 coacts with a novel anchor escapement mechanism later to be described in detail. This second escapement wheel 125 rotates independently of the escapement 120 and in the present form of my invention coacts with other devices to afford an advance of the carriage variable distances either above or below the normal letter space advance afforded by the normal escapement wheel 120, and accordingly the escapement wheel 125 will hereinafter be referred to as the "differential" escapement wheel.

It was previously described that the carriage of the present machine is biased by the spring drum 26 from right to left, and accordingly the shaft 31 is biased to rotate in a counter-clockwise direction as viewed from the top as in Figs. 3, 4 and 5. The hub member 103 being mounted to rotate with the shaft 31 likewise tends to rotate in a counter-clockwise direction, which in turn tends to rotate both the normal escapement wheel 120 and the differential escapement wheel 125 in the same direction due to the planet pinion 110 meshing with the teeth of the internal gear 116 and the sun pinion 115. However, normally both the normal and the differential escapement wheels are held against rotation in a counter-clockwise direction by the holding dogs of their respective escapement mechanisms which will later be described in detail, but it may be seen in Fig. 5 that rotation of the shaft 31 in a counter-clockwise direction may be afforded for letter space movements of the carriage or for spacing between words by allowing either the normal or the differential escapement wheel to rotate in a counter-clockwise direction. In one instance the rotation of the normal escapement wheel 120 affords rotation of the hub member 103 relative to the then stationary sun pinion 115 due to rotation of the planet pinion 110 in a counter-clockwise direction around its pivot 111. This results in a letter space movement of the member 108 and the shaft 31 operatively connected to turn therewith. In the other instance the rotation of the differential escapement wheel 125 affords rotation of the hub member 103 relative to the then stationary outer member 117 due to rotation of the planet pinion 110 in a clockwise direction about its pivot 111. Such movement of the planet pinion results in a movement of the member 108 and the shaft 31 operatively connected to turn therewith.

It is well known that various different ratios of relative speeds of the different members may be provided in an epicyclic or planetary gearing arrangement of the present type, and as the choice of such gear ratios determines to a large extent the relative number of teeth of the normal and differential escapement wheels as well as the design of certain other parts of the present mechanism, it is considered best to generally discuss the present selection of gear ratios before entering into the specific description of the remainder of the escapement mechanism.

It is not intended that the present choice of gear dimensions represents one that should be provided in every instance, but rather these dimensions have been selected with certain considerations in mind which will hereinafter appear and are shown merely as an example to illustrate one method of designing the present device in view of the various factors involved therein. In the present instance, it was elected to retain the same number of teeth on the normal escapement wheel 120 as ordinarily employed in the #10 Remington Noiseless machine, or as may be seen in Fig. 4 the normal escapement wheel 120 is provided with fifteen teeth, the same as ordinarily used in this machine with pica type to provide a one-tenth inch carriage advance by a one-tooth movement of the escapement wheel. However, it will be clear that if the machine were provided with other type, for example elite type, the number of teeth on the normal escapement wheel 120 in the present arrangement would be modified in accordance with the usual practice.

With the present planetary gearing however, the normal escapement wheel 120 is not directly connected to move at the same speed as the escapement shaft 31 as is the case in the usual construction, but when employing planetary gearing of the present type, the ratio of the speed of the normal escapement wheel 120 to the speed of the escapement shaft 31 will be equal to the diameter of the internal gear 116 divided by the sum of this diameter of the internal gear 116 plus the diameter of the sun pinion 115. In the illustrated form, the diameter of the sun pinion 115 is two times the diameter of the planet pinion 110 which determines the diameter of the internal gear 116 as four times the diameter of the planet pinion 110, or two times the diameter of the sun pinion 115. It may accordingly be calculated from the above formula of speed ratios that the speed of the shaft 31 will be two-thirds the speed of the normal escapement wheel 120.

In order to compensate for this difference between the speed of the shaft 31 and the speed of the normal escapement wheel 120, the feed pinion 30 has, in the present instance, been slightly enlarged in the present construction. In other words, the feed pinion 30 is made one and one-half times the size ordinarily employed in this machine whereby a one-tooth movement of the normal escapement wheel 120 allows the same one-tenth inch carriage advance, in the present construction wherein the movement of the feed shaft 31 is only two-thirds this amount, as is allowed by a one-tooth movement of a similar escapement wheel directly connected to the feed shaft. In providing such an increased diameter feed pinion, it will be clear that the feed rack 29 should be accordingly positioned a greater distance from the center line of the shaft 31 than in the usual construction.

It may be seen from the above discussion that the normal escapement wheel 120 coacts with the carriage in the present construction in the same manner as in the usual construction to advance the carriage one-tenth of an inch in a character spacing direction by a one-tooth rotation thereof. The dog rocker escapement mechanism coacting with this normal escapement wheel 120 may be of the usual construction as previously stated or may be of any other suitable construction. However, in the present instance I have illustrated the usual mechanism employed in the above mentioned Remington machine, and this construction will be generally described before entering into a detail description of the differential escapement mechanism.

This normal escapement mechanism as shown particularly in Fig. 2 and Fig. 4 comprises the usual dog rocker 130 mounted at down-turned end portions thereof on pivot screws 131 and 132 extending through rearward and downward extensions 133 and 134 respectively of the same bracket 105 employed to rotatably support the hub member 103. A forward extending arm 135 on this dog rocker carries on the upper side thereof a normally engaged holding dog 136, pivoted at 137 thereon and biased to a normal position by a spring 139 and limited in its movement in this direction by a stop pin 138. When the carriage is returned to the right without disengaging the feed rack 29, the escapement wheel 120 will turn backward in the usual manner by forcing the holding dog 136 rearwardly out of the path of the teeth against the force of the spring 139. The holding dog 136 may also be released by the usual tabulator mechanism coacting with an arm 140 on the holding dog, which tabulator mechanism has not been shown but may be of the usual construction and coacts with the brake wheel 106 as previously mentioned.

A stepping dog 142 is pivoted at 143 on the under side of the arm 135 of the dog rocker to receive a limited resilient movement against the force of the same spring 139 employed to bias the holding dog 136. This resilient movement of the stepping dog is in the direction of feed of the escapement wheel 120 and is limited by a stop arm 144 pivoted at 145 to a rearward extension 146 on the dog rocker 130 and having its forward end entering a bifurcation 147 in the tail of the stepping dog. This arrangement provides a limited resiliency in the stepping dog, and the position of this stepping dog assembly may be varied by adjusting the pivot 145 to various set positions along a slot 148 in the extension 146 of the dog rocker.

This dog rocker escapement assembly pivotally mounted on the pivot screws 131 and 132 is biased by the usual means to a position limited by an adjustable stop means where the holding dog 136 engages a tooth of the escapement wheel 120, which biasing means and stop means have not been shown in order to simplify the present disclosure as the function of the such means is readily apparent. This dog rocker assembly is independently operable in the usual manner by either of the pull rods 83 or 92 previously described in connection with Fig. 1, the pull rod 83 passing freely through an opening in a right-hand depending arm 150 on the dog rocker 130 while the pull rod 92 passes freely through an opening in a similar left-hand depending arm 151 also on the dog rocker 130. Suitable sleeved nuts 152 and 153 are threaded on the rear ends of the pull rods 83 and 92 respectively, these nuts having headed portions engageable with the rear surfaces of their respective arms 150 and 151 while the sleeve portions thereof are slidable freely through the openings. With this arrangement a forward pull on either one of the rods 83 or 92 can operate the dog rocker without affecting the other rod, and the amount of lost motion between the heads of the sleeved nuts 152 and 153 and their respective arms may be readily adjusted by turning on their respective rods with lock nuts 154 and 155 provided for retaining their adjusted positions.

The operation of the escapement mechanism thus far described has not been materially changed by the incorporation of my invention therein or that is, an operation of any one of the printing keys, such as 60 in Fig. 1, operates the type bar mechanism toward the printing point thereby effecting through the universal bar 75 a forward movement of the pull rod 83 which actuates the dog rocker 130 in a manner to lift the holding dog 136 out of the path of one tooth of the normal escapement wheel 120 and to move the stepping dog 142 into the path of the on-coming tooth, thereby advancing the carriage in the usual manner, and when the type bar returns from the printing point, the pull rod 83 is returned to its forward position by the spring 84 to allow the dog rocker to return to its normal position under the force of its biasing means thereby moving the stepping dog 142 out of the path of the tooth engaged thereby and moving the holding dog 136 back into the path of this tooth released by the stepping dog. In this manner the normal escapement wheel 120 is allowed to rotate one-tooth space by a complete operation of any one of the printing keys, which movement operates through the planetary gearing arrangement as previously described to allow a normal letter space advance of the carriage. An operation of the usual space bar 90 effects a forward movement of the pull rod 92 in the manner previously described which oscillates the dog rocker assembly in the same manner as the pull rod 83 to also allow the escapement wheel 120 to rotate one-tooth space and advance the carriage the same normal letter space distance.

During operation of the normal escapement mechanism to allow rotation of the feed shaft 31 through rotation of the normal escapement wheel 120, the differential escapement wheel 125 is held against rotation by its cooperative escapement mechanism which of course is not ordinarily operated at such times, and likewise it is intended that the normal escapement wheel 120 will ordinarily be held against rotation by the holding dog 136 when the differential escapement wheel 125 is allowed to rotate for advancing the carriage abnormal distances.

In the present planetary gearing arrangement, the ratio of the speed of the differential escapement wheel 125 to the speed of the feed shaft 31 will be different from that of the normal escapement wheel 120 to the feed shaft, it being well recognized that this former ratio will be equal to the diameter of the sun pinion 115 divided by the sum of this diameter of the sun pinion 115 plus the diameter of the internal gear 116. The diameter of the internal gear 116 being two times the diameter of the sun pinion 115, it may be seen from the above that the speed of the feed shaft 31 will be one-third the speed of the differential escapement wheel 125. Accordingly it will be apparent that the angular rotation of the differential escapement wheel 125 required to allow a normal latter space rotation of the feed shaft 31 will be double the angular rotation of the normal escapement wheel 120 required to allow the same normal letter space rotation of the feed shaft 31. This is due to the fact that the speed of the differential escapement wheel is one-third the speed of the escapement shaft 31 while the speed of the normal escapement wheel is two-thirds the speed of said shaft. Inasmuch as one-fifteenth of a revolution or 24 degrees is required of the fifteen-tooth normal escapement wheel 120 to provide a normal letter space advance of the carriage, it will be clear that two-fifteenths of a revolution or 48 degrees will be required of the differential escapement wheel 125 to provide the same normal letter space advance of the carriage.

In the present form of my invention, it has been elected to so arrange the differential escapement mechanism that the carriage may be advanced thereby through distances which are variable in multiples of one-tenth part of a normal letter space distance. Accordingly, ten teeth are provided in the 48 degree sector through which the differential escapement wheel 125 must rotate to provide a normal letter space advance of the carriage, this being due to the fact that the distance the carriage is advanced by the present differential escapement mechanism is to be in multiples of the teeth of the differential escapement wheel 125. It will accordingly be clear that if this 48 degree sector is provided with ten teeth, the complete 360 degree circumference of the differential escapement wheel 125 will be provided with seventy-five teeth.

Referring particularly to Figs. 2, 3 and 6, the escapement mechanism coacting with the differential escapement wheel 125 includes an anchor escapement designated as a whole by the reference numeral 160 pivoted at 161 to the lower end of a rearward and downward extension 162 of the same bracket 105 employed to support the hub member 103 and the normal dog rocker 130. The left-hand arm of the anchor escapement 160 is provided with a fixed dog 165 normally engaging a tooth of the differential escapement wheel 125 while the right-hand segmental arm 166 normally holds a movable dog 168 out of the path of these teeth. The movable dog 168 is carried by an arm 170 extending radially below the differential escapement wheel 125, which arm 170 is provided with a hub 171 whereby it is mounted for rotation concentrically with the escapement wheel 125 on anti-friction bearing balls 172 retained in an annular race formed within the hub 171 and a companion race formed jointly by a lower level on the hub of the escapement wheel 125 and an upper bevel formed on a retaining ring 173 threaded thereon.

It may be seen in Figs. 7 and 8 that the movable dog 168 is provided with an enlarged portion extending transversely above the arm 170, which portion carries grooved rollers 175 mounted to turn on screws 176 to engage opposite edges of the arm 170. A screw 177 extends upwardly through a longitudinal slot 178 in the arm 170 with an elongated upper end threaded through a tapped opening in the movable dog 168. An expansion spring 179 is carried at one end by a shouldered screw 180 threaded into a flat surface formed on the upper extending portion of the screw 177 while the other end of said spring is carried by a like shouldered screw 181 threaded into a flat surface formed on a pin 182 carried at the outer end of the radial arm 170. A roller 183 is rotatably carried beneath the arm 170 on an enlarged diameter portion of the lower end of the screw 177, which roller 183 is biased by the spring 179 into engagement with the outer edge of the arm 166 of the anchor escapement 160.

In this manner, the movable dog 168 is mounted to move longitudinally on the arm 170 from its position shown in Fig. 3 toward the teeth of the escapement wheel 125 by the force of the spring 179, which motion is under the control of the segmental arm 166 of the anchor escapement 160. The movable dog 168 is also mounted to travel with the arm 170 concentrically around the escapement wheel 125 against the force of a spiral spring 185, the inner end of the spring 185 being attached at 186 to a continuation 187 of the extension 162 of the bracket 105, and an extended free end of the spring 185 engages a pin 188 extending downwardly from the arm 170. The arm 170 is biased by the spring 185 in a clockwise direction to a definite position where the movable dog 168 is positioned to enter an interdental space in the escapement wheel 125. This position of the wheel 125 is determined by the engagement of the fixed dog 165 with the wheel, whereas the position of the arm 170 is determined by an L-shaped bracket or stop 189 suitably attached to the cross member of the machine frame F and engaged by the edge of the arm 170 in its normal position illustrated in full lines in Fig. 3.

An actuating arm 190 on the anchor escapement 160 extends to the right of the pivot 161, the end of the arm 190 being attached to a contractile spring 191 extending to a bracket 192 (see Fig. 4) which may be suitably attached to the rear end plate (not shown) of the machine frame F. The anchor escapement 160 as shown in Fig. 3 is thus biased in a counter-clockwise direction about its pivot 161 to a normal position wherein the fixed dog 165 enters an interdental space in the escapement wheel 125, and this normal position is adjustably limited by engagement with an eccentric head of a stop pin 194 carried by the bracket extension 162. The anchor escapement 160 is operable in a clockwise direction against the force of the spring 191 to its dotted position shown in Fig. 3, which position is also adjustably limited by engagement with an eccentric head of a stop pin 195 also carried by the bracket extension 162.

The operating means for the anchor escapement 160 includes a pull rod 196 passing through an opening in the end of the actuating arm 190 and coacting therewith through an adjustable sleeved nut 197 threaded thereon and locked in its adjusted position by a nut 198 whereby the head of the sleeved nut 197 engages the rear surface of the arm 190, or if desired the nut 197 could be adjusted so that a certain amount of lost motion would be taken up before the arm 190 could be operated thereby. In the present form of my invention, the pull rod 196 has been shown in Figs. 1 and 2 as operable by a special space key mechanism although my invention contemplates other methods of operating the differential escapement mechanism as will be later pointed out. The special key mechanism includes an additional key lever 200 pivotally mounted at 201 to an extension of the frame member carrying the usual space key rock shaft 89, the additional lever 200 extending along the right-hand side of the machine and carrying at its front end a special space key or bar 205 positioned at the right of the ordinary space bar 90 which may be shortened to provide additional space for the special bar 205. An arm 206 extends rearwardly and upwardly from the pivot point of the additional key lever 200, which arm 206 is pivotally attached at 207 to the pull rod 196, whereby the rod 196 is pulled forwardly to operate the anchor escapement 160 by a depression of the special space bar 205.

The special key lever 200 is biased to an upper normal position by a suitable spring means which has herein been shown as a contractile spring 210 extending rearwardly from the arm 206 to a pin 211 attached to a suitable portion of the machine frame F. The special key lever 200 is limited in its movement to normal position by a padded stop button 212 carried by the lever 200 and engageable with a fixed angle bracket 213, and the depressed position of the special space key or bar 205 is also limited by a padded stop button 214 carried by the front of the frame F of the machine and engageable by the lower surface of the bar 205.

The present special space key 205 is intended for use only in spacing between words when rewriting for the purpose of justification, and accordingly this special key will not be used ordinarily in writing the original or unjustified copy. Accordingly, it is considered advisable to provide means for preventing accidental or inadvertent operation of this special key 205 when the machine is not to be operated for providing justified copy. This means is shown particularly in Figs. 17, 18 and 19, and comprises a manually operable lock member 218 pivotally carried at 219 by a bracket 220 attached at 221 to the inner surface of the front member of the machine frame F. The front end of the lock member 218 extends through an opening 217 in the frame F and terminates in a knob 222 whereby the rear end of the lock member 218 may be shifted in a horizontal plane into or out of the downward path of the special key lever 200. The lock member 218 is illustrated in Fig. 19 in a position locking the special key 205 against effective operation, and is shiftable to a dotted position which permits operation of the special key when rewriting for the purpose of justification.

When the special key 205 is depressed the anchor escapement 160 is rotated in a clockwise direction (see Fig. 3) about its pivot 161 to its dotted line position as previously explained, and in such operated position the fixed dog 165 is removed from the path of the teeth of the differential escapement wheel 125 and at the same time the movable dog 168 is allowed by the movement of the segmental arm 166 to move radially along the arm 170 under the force of the spring 179 into an interdental space in the escapement wheel 125. The arm 166 is off-set to pass beneath both the escapement wheel 125 and the arm 170 as may be seen in Fig. 6, and when operated to its dotted position, the outer edge thereof is concentrically curved around the center of the escapement wheel 125. When the escapement wheel 125 is released by the removal of the fixed dog 165, the movable dog 168 having entered an interdental space in the escapement wheel is carried thereby in the counter-clockwise direction of feed by the force of the carriage spring drum 26, the roller 183 traveling around the outer edge of the arm 166.

It will be clear that the distance through which the escapement wheel is permitted to thus carry the movable dog 168 determines the distance the carriage is advanced by the depression of the special key 205, and accordingly the present invention contemplates means for affording variable advances of the carriage by varying the distance through which the movable dog may be carried by the differential escapement wheel. In the illustrated form of this means the movable dog 168 may be carried from its normal position by the escapement wheel 125 in a counter-clockwise direction until a stop pin 224 extending downwardly from the arm 170 engages a stop member or arm 225. The stop arm 225 is pivotally carried by the usual cross member 227 being provided with a special extending portion 228 and an overlapping portion 229, the overlapping portion 229 rotatably receiving a shouldered hub 230 attached to the stop arm 225 with a collar 231 attached thereon at 232 for retaining the hub 230 within the portion 229 as shown in Fig. 9.

The stop arm 225 is curved as shown in Fig. 3 and is provided with notches forming stop faces 235, each stop face being at right angles to a line radiating thereto from the axis of the arm 225, whereby the thrust exerted by the engagement of the circular pin 224 with any one of these stop faces 235 will be substantially toward the axis of the arm 225 thus preventing the stop arm from being turned by the impact in stopping the arm 170.

The stop arm 225 is shown in a position which will arrest the arm 170 after being carried by the escapement wheel 125 to its dotted line position $a$ which is a distance equal to ten toothspaces or 48 degrees, which movement of the differential escapement wheel affords a normal letter space advance of the carriage as previously described. The stop arm 225 may be rotated in either direction from this illustrated position, the maximum rotation in a counter-clockwise direction arresting the arm 170 after being carried to its dotted position $b$ which is a distance equal to nineteen tooth spaces of the escapement wheel 125 allowing a carriage advance of one and nine-tenths times a normal letter space distance. The maximum rotation of the stop arm 225 in a clockwise direction positions the end stop face 235 in the path of the pin 224 so that the arm 170 is arrested after being carried only one tooth space of the escapement wheel 125, allowing a carriage advance of one-tenth of a normal letter space distance. There are accordingly nineteen different stop faces 235 distributed along the stop arm 225 in the present form, which according to the rotated position of the stop arm 225 can arrest the arm 170 after traveling to any one of nineteen different positions illustrated by the various dotted circles $c$ in Fig. 3 showing various arrested positions of the pin 224, these positions representing distances of travel of the escapement wheel 125 in multiples of its teeth from a minimum of one tooth to a maximum of nineteen teeth.

In this manner, it will be evident that according to the rotated position of the stop arm 225, a depression of the special key 205 can allow any degree of advance of the carriage from a minimum of one-tenth of a normal letter space distance to a maximum of one and nine-tenths times a normal letter space distance, the variations within this range being in multiples of one-tenth part of such normal letter space distance. When the special key 205 is released, the anchor escapement 160 is returned to its normal position by the force of the spring 191, and the escapement wheel 125 having rotated an exact number of tooth spaces, the fixed dog 165 will exactly enter an interdental space thereof to hold such position after the segmenal arm 166 disengages the movable dog 168 from the teeth of the escapement wheel. Immediately upon removal of the movable dog 168 from the teeth of the escapement wheel 125, the spring 185 returns the arm 170 together with the movable dog in a clockwise direction to its normal position against the stop bracket 189 and the entire mechanism is in its normal condition ready for the next operation.

It will be understood that under each setting of the stop arm or control member 225 the actuation of the special key 205 will automatically bring about an advance of the carriage the required irregular distance to space between words in accordance with or as determined by the setting of the member 225. Such irregular or abnormal spacing will continue until the member 225 is set to a new position.

Various means may be provided for adjusting the stop arm 225 to predetermine the carriage advance afforded by the differential escapement mechanism, the particular means shown herein in Figs. 10 and 11 comprising a manually operable dial member 240 rotatably mounted on the usual vertical front plate 241 of the machine and connected with the hub 230 of the stop arm 225 by a flexible shaft or cable which may be extended between these points without necessitating any modification of the existing structure. The hub portion of the dial 240 may be provided with an opening receiving the end of a shaft 243 extending forwardly through an opening in the front plate 241 with an annular shoulder bearing against the rear surface of this front plate and its outer end retained within the hub of the dial 240 by a set screw 244.

One end of a flexible shaft or cable 245 is sweated or otherwise fastened within a concentric opening in the rear end of the shaft 243, which cable extends at a convenient location through the machine to the stop arm 225, the other end of the cable 245 being likewise sweated or suitably fastened within an opening in the lower end of the hub 230 of the stop arm 225, as shown in Fig. 9. The cable 245 may be of any well known construction adapted to transmit rotary motion from the dial 240 to the stop arm 225 without back lash, lost motion, or twisting, and this cable 245 is herein shown as enclosed by a stationary flexible sheath 246, one end of which is clamped by a screw 247 within an opening in a bracket 248 extending from the frame F and the other end is retained within an opening in the extension 228 of the frame cross member 227 by a screw 249.

An indexing means or scale 250 may be suitably marked upon the face of the dial 240 which coacts with a pointer 251 attached at 252 to the front plate 241, this scale 250 having suitable numeral markings or indices thereon shown in the present instance in terms of decimal parts of normal letter spaces. The dial 240 is shown in Fig. 10 as set at a position wherein the pointer 251 registers with the numeral "1," which positions the stop member as shown in Fig. 3 to allow one normal letter space advance of the carriage upon an actuation of the special key 205. It will be clear that the scale 250 may be accordingly arranged so that any one of the nineteen different positions of the stop member 225 can be accurately established by movement of the dial 240. It will be noted however that due to the entrance of the cable 245 into the lower end of the hub 230 of the stop arm 225, a rotation of the dial 240 in a clockwise direction causes a rotation of the stop arm 225 in a counter-clockwise direction as viewed from above as in Fig. 3. The scale 250 is accordingly arranged so that the dial 240 is rotated in a clockwise direction to move the stop arm 225 to a position permitting a greater movement of the arm 170 thus increasing the distance the carriage is to be advanced, and on the other hand, the dial 240 is rotated in a counter-clockwise direction to decrease the distance the carriage is to be advanced.

The modified form of my escapement mechanism shown in Figs. 13, 14 and 15 has been applied to the same No. 10 Remington Noiseless machine, and accordingly many parts of the mechanism shown in these views may be the same as parts already described in connection with the previous form of my invention so that a description of such parts need not be repeated as like reference characters with the exponent $a$ added in each instance have been assigned thereto. The essential difference in this modified form over the first form is that the arrangement of the normal and differential escapement wheels with respect to the planetary gearing is reversed. That is to say, in the modified form a normal escapement wheel 260 is carried by the sun pinion $115^a$ and a differential escapement wheel 262 is carried by the internal gear $116^a$. The carriage advance afforded by the differential escapement mechanism in this modified form is also adjustable in multiples of one-quarter part rather than one-tenth part of a normal letter space, and the escapement mechanism has been designed for a machine having elite type whereing a sixteen-tooth escapement wheel is ordinarily employed rather than the fifteen-tooth wheel employed in machines having pica type.

The same size feed pinion (30 and $30^a$), sun pinion (115 and $115^a$), planet pinion (110 and $110^a$) and internal gear (116 and $116^a$) are employed in both forms of my invention, but the speed of the normal escapement wheel 260 being carried by the sun pinion $115^a$ in this form is one-third the speed of the escapement shaft $31^a$, but as the increased diameter of the feed pinion $30^a$ provides a speed of the escapement shaft $31^a$ which is one and one-half times its usual speed, it will be clear that in this modified arrangement, the speed of the normal escapement wheel 260 will be one-half the speed of the usual escapement wheel employed in this machine. The normal escapement wheel 260 in this form is accordingly provided with eight teeth, which by a one-tooth movement thereof allows the carriage to advance the same distance as a one-tooth movement of the sixteen-tooth wheel ordinarily employed in this machine. The dog rocker escapement mechanism coacting with this eight-tooth escapement wheel 260 may be the same as employed in the previous form to coact with the normal escapement wheel 120 and accordingly a description thereof is not considered necessary. This dog rocker assembly is, however, mounted lower in the machine by longer extensions 264 of the bracket $105^a$, but is operable in the same manner by operation of any one of the printing keys through the pull rod $83^a$ or by operation of the usual space bar 90 through the pull rod $92^a$.

An outer cylindrical member 266 (see Fig. 13)

is provided which is very similar to the corresponding member 117 in the previous form but is slightly modified to carry the differential escapement wheel 262 and the hub 171ᵃ of the radial arm 170ᵃ. The hub 171ᵃ is mounted in the same manner on the bearing balls 172ᵃ which are retained by the ring 173ᵃ, the hub 171ᵃ and ring 173ᵃ being the same in construction as in the previous form but slightly larger in diameter to surround the outer cylindrical member 266 in this case. The speed of the differential escapement wheel 262 being driven by the outer gear 116ᵃ in this form is two times the speed of the normal escapement wheel 260 and accordingly only one-sixteenth of a revolution is required of the differential escapement wheel 262 to allow the same normal letter space advance of the carriage as allowed by a one-tooth movement or one-eighth of a revolution of the normal escapement wheel 260. The present differential escapement means being adjustable in multiples of one-quarter part of a normal letter space then requires this one-sixteenth part of the differential escapement wheel 262 to be divided into four tooth spaces, thus requiring sixty-four teeth on the differential escapement wheel 262.

The arm 170ᵃ in the present form is biased by a contractile spring 268 against a stop pin 269 carried by an extension 271 of the bracket 105ᵃ, the spring 268 extending from the end of the arm 170ᵃ to a bracket 270 also attached to the arm of the cross member 227ᵃ, as may be seen in Fig. 14. An anchor escapement designated as a whole by the reference numeral 272 is also employed in this form which is substantially the same as the anchor escapement 160 in the previous form, but in this case it is pivotally mounted at 273 to a rearward extension 274 of the bracket 105. The anchor escapement 272 is biased to its normal position by the same spring 191ᵃ acting on an actuating arm 275, the normal position being adjustably limited by a stop pin 276 carried thereby and having an eccentric head engaging one edge of the extension 274. The anchor escapement 272 is operable in the same manner as in the previous form from the special key arrangement through the pull rod 196ᵃ connected to the actuating arm 275. The operated position of the anchor escapement 272 is herein adjustably limited by a stop pin 277 carried thereby and having an eccentric head engageable with the other edge of the extension 274.

A fixed dog 278 is also carried by the left-hand arm of the anchor escapement 272 and a segmental right-hand arm 279 coacts with the same movable dog 168ᵃ in the same manner as the arm 166 in the previous form, the arm 279 in this case being shorter than the arm 166. A stop arm 280 is provided in this form which functions in the same general manner as the stop arm 225 in the previous form, but in this case, the stop arm 280 is provided with only six stop faces 281 which, however, coact with the stop pin 224ᵃ in the same manner to arrest the arm 170ᵃ after being operated by the escapement wheel 262 to any one of six different positions represented by the dotted circles d in Fig. 14.

The same dial 240ᵃ may in this form be employed to manually rotate the stop arm 280 to any one of its six different positions, an indexing means or scale 284 being employed thereon which is modified to indicate the fractional parts of normal letter spaces which the carriage will be advanced at the various settings thereof. A flexible connection comprising the same cable 245 and sheath 246 may also be employed in this form to connect the dial 240ᵃ to the stop arm 280. The stop arm 280 is shown in Fig. 14 as positioned to arrest the radial arm 170ᵃ after being carried to its dotted line position e which is a distance equal to four tooth spaces or one-sixteenth of a revolution of the differential escapement wheel 262 thus permitting a normal letter space advance of the carriage which is in accordance with the position of the dial 240ᵃ shown in Fig. 15 wherein the pointer 251ᵃ registers with the numeral "1."

The scale 284 is likewise arranged in this form so that a clockwise rotation of the dial 240ᵃ from its illustrated position allows the carriage to advance a distance greater than a normal letter space while a counter-clockwise rotation therefrom allows the carriage to advance a distance less than a normal letter space, this carriage advance of course being under the control of the special space key 205. It will therefore be clear that according to the setting of the dial 240ᵃ, the carriage may be advanced in this form a distance equal to either one-quarter, one-half, three-quarters, one, one and one-quarter or one and one-half letter spaces. In the present form the stop arm 280 has not been shown with a stop face allowing a carriage advance of one and three-quarters letter spaces, but obviously the arm 280 could be modified to include such a stop face.

In operating a typewriting machine equipped with either form of my invention, the machine may be employed in the usual manner for typing unjustified copies, during which the special space key 205 is not ordinarily used. In rewriting such unjustified copy, the lines may be made of uniform length by observing the amount which each line is to be expanded or contracted and accordingly setting the dial 240 or 240ᵃ before rewriting each line to provide either greater or less than a normal letter space advance of the carriage between words. The special space key 205 is then operated once at the end of each word of the line to operate the differential escapement mechanism and allow the carriage to advance the distance predetermined by this setting of the dial 240 or 240ᵃ, thereby expanding or contracting each line by varying the spacing between words only and without modifying the ordinary spacing between the letters of the words, the spacing between the letters of the words being effected by the normal escapement mechanism under control of the printing keys in the usual manner.

It will be clear that there are two factors determining the setting of the dial 240 or 240ᵃ preparatory to rewriting each line for justification, one factor being the number of letter spaces which the line must be expanded or contracted in length, the other factor being the number of spaces between words representing opportunities of effecting this expansion or contraction. These two factors are so interrelated that obviously the setting of the dial 240 or 240ᵃ will be a quotient arrived at or approximated by dividing the number of letter spaces which the particular line must be expanded or contracted by the number of spaces between words. It is presumed that an operator after becoming proficient in the use of the present device will be able to readily estimate the setting of the dial required to justify most lines, or a table or chart may be employed showing the setting of the dial required to provide various degrees of line expansion or contraction for the various number of spaces between words which lines ordinarily include, thereby relieving the operator of any calculation.

A highly efficient and reliable means has thus been provided with the aid of which typewritten lines of unjustified copy may be rapidly rewritten into lines of uniform length, which means may be readily embodied in a typewriting machine of standard construction without modifying or materially modifying the existing structure.

This means for justifying lines has herein been shown as including a special key arrangement described as operable in rewriting for justification to effect variable word spacing as established by the setting of a manually controllable member, but this special key arrangement may be used for other purposes as well. For example, this special key 205 may be employed in ordinary typing of unjustified copy to effect by a single operation the additional space employed at the end of a sentence, or that is in ordinary typing, the dial 240 or 240ª could be set to provide one and nine-tenths times a full letter space advance of the carriage and the special key 205 could then be operated once after typing the period at the end of a sentence to provide the requisite space before starting the next sentence, thereby saving an additional operation of a space key usually effected to provide adequate spacing. This abnormal space could also be provided in another manner by setting the dial 240 or 240ª at "1" and operating both the usual space bar 90 and the special space key 205 simultaneously to allow the carriage to advance two full letter spaces by a single operation before starting a new sentence.

It is also to be understood that from certain aspects of my invention the present differential escapement mechanism is not confined to its operation by a special key, but obviously could be operated by the usual space bar 90 by connecting the pull rod 92 or 92ª directly to the actuating arm 190 or 275 of the anchor escapement 160 or 272 in place of the pull rod 196 or 196ª and the complete special key arrangement could be omitted. With such an arrangement the dial 240 or 240ª would be set at "1" to provide a normal letter space advance of the carriage by an operation of the usual space bar 90 when typing the unjustified copy, and in rewriting, the dial 240 or 240ª would be positioned for justifying between words in the previously described manner but controlled by operation of the usual space bar 90.

Although the present differential escapement mechanism has been herein described as employed to effect variable spacing between words only, it is obvious that this same mechanism could be used as well to effect variable spacing between the printing characters of the words throughout the line in accordance with a predetermined setting of the dial, as for example in writing open spaced headings or emphasizing words by open spacing such words. Such an arrangement could be readily provided by connecting the anchor escapement 160 for the differential escapement wheel for operation by the universal bar 75 through the pull rod 83 or 83ª, and the dog rocker 130 or 130ª for the normal escapement wheel could be connected for operation by the space bar through the pull rod 92 or 92ª, in which case the special key mechanism could be omitted.

On the other hand, the differential escapement mechanism could be employed alone and connected directly to the carriage feed shaft. In this case, the anchor escapement 160 would be operated by either the printing keys or the space bar, whereby the advance of the carriage for both letter spacing and word spacing throughout the entire line could be variably established by the setting of the dial.

The planetary gearing employed in the present invention is obviously susceptible to various modifications, two methods of thereby interconnecting the two escapement wheels with the escapement shaft being shown in the illustrated forms of the present invention. The first form shown particularly in Fig. 2 has a very definite advantage when the carriage advance allowed by the differential escapement wheel is to be adjustable in multiples of a very small fraction of a normal letter space. This is due to the fact that the speed of the differential escapement wheel in this case is two times the speed of the normal escapement wheel so that the angular distance through which the differential escapement wheel must rotate to allow a normal letter space advance of the carriage is twice the angular distance through which the normal escapement wheel must rotate to allow the same advance of the carriage. It will accordingly be obvious that in a given diameter escapement wheel, the greater this angular rotating distance becomes, the larger will be the number of teeth of practical size which may be distributed therein, and accordingly the smaller and more accurate will be the variation in the advance of the carriage.

In the second form of the escapement mechanism of the present invention, shown particularly in Fig. 13, the relative speeds of the two escapement wheels are reversed or that is, the speed of the normal escapement wheel is twice the speed of the differential escapement wheel, but in this form the advance of the carriage is adjustable in multiples of a considerably larger part of a normal letter space. This arrangement has an advantage from a practical standpoint of reducing the rotation required of the radial arm 170 which reduces the size of the apparatus and may tend to increase the speed of operation.

The main function of the planetary gearing, however, is to allow rotation of the escapement shaft by rotation of either one of two separate escapement wheels or carriage feed devices independently of the other, and accordingly any suitable epicyclic arrangement could be used for this purpose. The particular type of epicyclic gearing shown in the accompanying drawings is known specifically as simple planetary gearing but in some instances it may be desirable to provide compound planetary gearing or any other well known type of epicyclic gearing.

It was previously mentioned that the devices of the present invention could be employed in various other characters of typewriting machines, and in referring to a "carriage" in the foregoing description and in the appended claims, it will be understood that such term is employed in a generic sense to apply to a flat platen machine wherein the printing instrumentalities are carried by and travel with the carriage, as well as to a platen-carrying carriage of the type herein illustrated, unless said "carriage" be otherwise more specifically defined.

It also should be understood that the term "escapement mechanism" is employed in a generic sense to apply to various carriage feed mechanisms of well known types and that the term "escapement rack" is employed in a generic sense to apply to such racks whether they be circular or straight.

I am aware that it has been proposed heretofore to provide variable letter space escapement mechanism to afford movements of the carriage to accord with the width of the printed characters. For example, it is old to provide for, say, three different extents of feed of the carriage to accord with, say, the narrowest, the medium and widest printed characters. However, in each instance the feed afforded the carriage is nevertheless a "letter space" feed irrespective of the extent thereof and in no instance is such feed for a fraction of a "letter space" as is required for effectively justifying lines of writing. Therefore, when I refer herein, and in the accompanying claims, to "letter space" feed and a "fractional part of a letter space feed" or employ like terms, such terms should be considered and understood in the light of what has been pointed out above.

It is also to be understood that in the foregoing description an attempt has not been made to point out all the alternate or optional features of construction that may be employed and that various modifications, adaptations and alterations may be applied to meet the requirements of practice and some parts of the construction may be employed without others without departing from my invention as defined in the accompanying claims.

What I claim as new and desire to secure by Letters Patent is:

1. The combination of a carriage, escapement mechanism therefor including two escapement racks, means for driving either of said escapement racks independently of the other by the carriage, keys, means under control of certain only of said keys for controlling one of said escapement racks to afford a normal letter space advance of the carriage, independently operable means under exclusive control of at least one other of said keys for controlling the other of said escapement racks to afford any one of variable extents of advance of the carriage in fractional amounts above or below the distance of said normal letter space, and settable means for predetermining the extent of variable advance of the carriage afforded by said independently operable means.

2. The combination of a carriage, escapement mechanism therefor including two escapement racks, means for driving either of said escapement racks independently of the other by the carriage, keys, means under control of certain only of said keys for controlling one of said escapement racks to afford a normal letter space advance of the carriage, independently operable means under exclusive control of at least one other of said keys for controlling the other of said escapement racks to afford any one of variable extents of advance of the carriage in fractional amounts above or below the distance of said normal letter space, and means for predetermining the extent of said variable advance of the carriage effected by said independently operable means.

3. In a typewriting machine for justifying typewritten lines the combination of a carriage; escapement mechanism therefor including two escapement wheels, epicyclic gearing intermediate said escapement wheels affording a movement of each of said wheels independently of the other; printing keys; means controlled thereby for affording at each actuation a uniform letter space movement of one of said escapement wheels, an independent special key other than the ordinary space key, and means controlled by said special key for affording a differential fraction letter spacing of the other of said escapement wheels, whereby a feed of the carriage may be effected by each actuation of said special key that differs from the uniform letter spacing effected at each actuation of a printing key.

4. The combination of a carriage; escapement mechanism therefor including two escapement wheels, planetary gearing intermediate said escapement wheels affording a movement of each of said wheels independently of the other; printing keys; means controlled thereby for affording at each actuation a uniform letter space movement of one of said escapement wheels, an independent special key, means controlled thereby for affording a differential spacing of the other of said escapement wheels, whereby a feed of the carriage may be effected by each actuation of said special key that differs from the uniform letter spacing effected at each actuation of a printing key, and adjustable means settable at will to predetermine the extent of differential spacing effected at each actuation of said special key.

5. The combination of a carriage, a feed shaft operatively connected with said carriage, a double section escapement mechanism, means operatively connecting each section of said double escapement mechanism to said feed shaft for independently operating each section by the carriage, a series of keys, means controlled by certain only of said keys for controlling one section only of said double escapement to afford a uniform normal letter space advance of the carriage at each actuation, means controlled by at least one of said keys to control the other section only of said escapement, said last mentioned means being arranged to afford a differential advance of the carriage which differs in fractional amount of a latter space from the said normal letter spacing, and adjustable means settable at will to regulate the extent of said differential advance of the carriage at each actuation.

6. The combination of a carriage, a feed shaft operatively connected with said carriage, a double section escapement mechanism, means operatively connecting each section of said double escapement mechanism to said feed shaft for independently operating each section by the carriage, a series of keys, means controlled by certain only of said keys for controlling one section only of said double escapement to afford a uniform normal letter space advance of the carriage at each actuation, means controlled by at least one of said keys to control the other section only of said escapement, said last mentioned means being arranged to afford a differential advance of the carriage which differs in fractional amount of a latter space from the said normal letter spacing, adjustable means settable at will to regulate the extent of said differential advance of the carriage at each actuation, and indexing means cooperative with said adjustable means to facilitate setting or adjusting it.

7. In a typewriting machine for justifying typewritten lines the combination of a carriage, and carriage escapement mechanism therefor comprising a feed pinion, two escapement wheels controlling said feed pinion, one for affording a normal letter space movement only of the feed pinion at each actuation; and the other for affording an abnormal movement of the feed pinion at each actuation in variable fractional amounts of a normal letter space of the feed pinion, and planetary gearing between and interconnecting said escapement wheels and that enables each escapement wheel to be actuated independently of the other to advance the carriage, the ratio between the escapement wheel for abnormal spacing and the feed pinion being a multiple of the ratio between the escapement wheel for normal spacing and the feed pinion.

8. In a typewriting machine for justifying typewritten lines the combination of a carriage, and carriage escapement mechanism therefor comprising a feed pinion, two escapement wheels controlling said feed pinion, one for affording a normal letter space movement only of the feed pinion at each actuation; and the other for affording an abnormal movement of the feed pinion at each actuation in variable fractional amounts of a normal letter space of the feed pinion, and planetary gearing between and interconnecting said escapement wheels and that enables each escapement wheel to be actuated independently of the other to advance the carriage, the ratio between the escapement wheel for abnormal spacing and the feed pinion being a multiple of the ratio between the escapement wheel for normal spacing and the feed pinion, the difference in the two ratios being as 2 to 1.

9. In a typewriting machine for justifying typewritten lines the combination of a carriage, and carriage escapement mechanism therefor comprising a feed pinion, two escapement wheels controlling said feed pinion, one for affording a normal letter space movement only of the feed pinion at each actuation; and the other for affording an abnormal movement of the feed pinion at each actuation in variable fractional amounts of a normal letter space of the feed pinion, and planetary gearing between and interconnecting said escapement wheels and that enables each escapement wheel to be actuated independently of the other to advance the carriage, the ratio between the escapement wheel for abnormal spacing and the feed pinion being a multiple of the ratio between the escapement wheel for normal spacing and the feed pinion, devices for controlling the operation of the escapement wheel for affording normal letter spacing, printing keys for controlling the operation of said devices, a special key, and separate means controlled thereby for controlling the escapement wheel for abnormal spacing.

10. The combination of a carriage, and carriage escapement mechanism therefor comprising a feed pinion, two escapement wheels controlling said feed pinion, one for affording a normal letter space movement only of the feed pinion at each actuation; and the other for affording an abnormal movement of the feed pinion at each actuation in fractional amounts of a normal letter space of the feed pinion, epicyclic gearing between and interconnecting said escapement wheels and that enables each escapement wheel to be actuated independently of the other to advance the carriage, the ratio between the escapement wheel for abnormal spacing and the feed pinion being a multiple of the ratio between the escapement wheel for normal spacing and the feed pinion, and hand controlled adjustable means settable at will for predetermining the extent of movement at each actuation of the escapement wheel that controls the abnormal spacing.

11. In a typewriting machine for justifying typewritten lines the combination of a carriage; and escapement mechanism therefor comprising a feed pinion, a shaft by which said feed pinion is carried, two escapement wheels relatively to which said shaft may be shifted in the direction of its length, epicyclic gearing operatively connecting said shaft and said escapement wheels and which affords a rotative movement of each of said escapement wheels independently of the other, key controlled means for controlling one of said escapement wheels for affording a normal letter space advance of the carriage at each actuation, and separate key controlled means for controlling the other of said escapement wheels to afford at each actuation an advance of the carriage for one or more fractional parts of a normal letter space.

12. The combination of a carriage; and escapement mechanism therefor comprising a feed pinion, a shaft by which said feed pinion is carried, two escapement wheels relatively to which said shaft may be shifted in the direction of its length, epicyclic gearing operatively connecting said shaft and said escapement wheels and which afford a rotative movement of each of said escapement wheels independently of the other, key controlled means for controlling one of said escapement wheels for affording a normal letter space advance of the carriage at each actuation, and separate key controlled means for controlling the other of said escapement wheels to afford at each actuation an advance of the carriage for one or more fractional parts of a normal letter space, and adjustable means settable at will to predetermine the number of fractional parts that said last mentioned escapement wheel may advance at each operation.

13. In a typewriting machine for justifying typewritten lines, the combination of a carriage, escapement mechanism therefor comprising an escapement wheel, a feed dog mounted to travel variable distances when in engagement with said escapement wheel, the construction and arrangement of the parts being such that for each tooth space advance of the escapement wheel a fraction of a letter space advance of the carriage is afforded, adjustable stop means for arresting the travel of said feed dog when in engagement with said wheel to variable fractions of a letter space, a single manually controlled device settable to maintain until manually reset said adjustable stop means in any one of a plurality of different positions, and indexing means associated with said manually controlled device for indicating the position of adjustment of said stop means to accord with variable fractions of letter space feed desired.

14. In a typewriting machine for justifying typewritten lines, the combination of a carriage, escapement mechanism therefor comprising an escapement wheel, a feed dog mounted to travel variable distances when in engagement with said escapement wheel, adjustable stop means for arresting the travel of said feed dog when in engagement with said wheel, a manually controlled device for adjusting said adjustable stop means, and indexing means associated with said manually controlled device for indicating the position of adjustment of said stop means; printing keys, and independently operable escapement devices controlled thereby for affording a uniform letter space movement of the carriage at each actuation thereof.

15. In a typewriting machine for justifying typewritten lines the combination of a carriage, and escapement mechanism therefor comprising an escapement wheel with sufficient teeth and operative connections therefrom to the carriage to afford a fractional part of a letter space advance of the carriage when the wheel advances a distance from one tooth thereof to the next, feed dogs cooperating with said wheel, one of said dogs being a stepping dog mounted for movement into and out of engagement with the teeth of said wheel and also for circular movement therewith, means for variably arresting said stepping dog when in engagement with the teeth of said wheel at positions corresponding to one or more fractional parts of a letter space, a single manually controlled device at the front of the machine settable to maintain until manually reset said arresting means in any one of a plurality of different positions, and indexing means associated with said manually controlled means for designating the setting thereof for such fractional letter space feed.

16. The combination of a carriage, and escapement mechanism therefor comprising an escapement wheel with sufficient teeth and operative connections to afford a fractional part of a normal letter space advance of the carriage when the wheel advances a distance from one tooth thereof to the next, feed dogs cooperating with said wheel, one of said dogs being a stepping dog mounted for movement into and out of engagement with the teeth of said wheel and also for circular movement therewith, and means for variably arresting said stepping dog at positions corresponding to one or more fractional parts of a normal letter space, printing keys, and separate independently operable escapement mechanism controlled thereby for affording a normal uniform letter space advance only of the carriage at each actuation of a printing key.

17. The combination of a carriage, and escapement mechanism therefor comprising an escapement wheel with sufficient teeth to afford a fractional amount of a normal letter space advance of the carriage when the wheel advances a distance from one tooth thereof to the next, feed dogs cooperating with said wheel, one of said dogs being a stepping dog, a carrier for said stepping dog having a variable movement around the axis of the escapement wheel and the stepping dog having a rectilinear movement on its carrier into and out of engagement with the teeth of the escapement wheel, means controlled by the movement of the other feed dog for controlling the movement of the stepping dog into and out of engagement with the escapement wheel, adjustable means for variably arresting said carrier, printing keys, and separate independently operable escapement mechanism controlled thereby for affording a normal uniform letter space advance only of the carriage at each actuation of a printing key.

18. The combination of a carriage, and escapement mechanism therefor comprising an escapement wheel with sufficient teeth to afford a fractional part of a normal letter space advance of the carriage when the wheel advances a distance from one tooth thereof to the next, an anchor escapement including a fixed dog, a dog carrier mounted to turn variable distances around the axis of said escapement wheel, a stepping dog mounted on said dog carrier to turn therewith and also for rectilinear movement thereon into and out of engagement with the teeth of said escapement wheel, means on said anchor escapement for controlling the rectilinear movement of said stepping dog, adjustable means for predetermining the extent of movement of said dog carrier, printing keys, and separate independently operable escapement mechanism controlled thereby for affording a normal uniform letter space only of the carriage at each actuation of a printing key.

19. The combination of a carriage, and escapement mechanism therefor comprising an escapement wheel, feed dogs cooperating therewith, one of said feed dogs being a stepping dog, a carrier for said stepping dog having a variable movement around the axis of said escapement wheel, and stopping means cooperating with said carrier to determine the extent of movement of the carrier and the stepping dog therewith, said stopping means comprising a pivoted stopping member having a plurality of stop faces thereon each of which may be brought into the path of said carrier and arrest it by an impact operating substantially against the dead center of the pivot of said pivoted stopping member.

CHARLES E. SMITH.

CERTIFICATE OF CORRECTION.

Patent No. 2,208,806. July 23, 1940.

CHARLES E. SMITH.

It is hereby certified that error appears in the printed specification of the above numbered patent requiring correction as follows: Page 3, second column, line 53, for the word "sift" read --shift--; page 6, first column, line 3, for "latter" read --letter--; line 58, for "level" read --bevel--; page 11, second column, lines 44 and 63, claims 5 and 6 respectively, for "latter" read --letter--; and that the said Letters Patent should be read with this correction therein that the same may conform to the record of the case in the Patent Office.

Signed and sealed this 10th day of September, A. D. 1940.

(Seal)

Leslie Frazer,
Acting Commissioner of Patents.